(12) United States Patent
Kew et al.

(10) Patent No.: US 8,872,846 B2
(45) Date of Patent: Oct. 28, 2014

(54) INTERACTIVE VIRTUAL WEATHER MAP

(75) Inventors: Matthew E. Kew, Roswell, GA (US); Eli Wendkos, Ackworth, GA (US); Jon Badenell, Marietta, GA (US); Casey A. Dement, Austell, GA (US); Cameron Brown, Ackworth, GA (US)

(73) Assignee: The Weather Channel, LLC, Atlanta, GA (US)

( * ) Notice: Subject to any disclaimer, the term of this patent is extended or adjusted under 35 U.S.C. 154(b) by 1078 days.

(21) Appl. No.: 12/315,815

(22) Filed: Dec. 4, 2008

(65) Prior Publication Data

US 2009/0160873 A1    Jun. 25, 2009

Related U.S. Application Data

(60) Provisional application No. 61/005,416, filed on Dec. 4, 2007.

(51) Int. Cl.
| | | |
|---|---|---|
| *G09G 5/00* | (2006.01) | |
| *G06Q 30/02* | (2012.01) | |
| *G09B 29/00* | (2006.01) | |
| *G06Q 10/00* | (2012.01) | |

(52) U.S. Cl.
CPC ............ *G06Q 10/00* (2013.01); *G06Q 30/0226* (2013.01); *G09B 29/007* (2013.01)
USPC ........................................................ 345/629

(58) Field of Classification Search
USPC ........................................................ 345/629
See application file for complete search history.

(56) References Cited

U.S. PATENT DOCUMENTS

| | | | | |
|---|---|---|---|---|
| 5,583,972 A | * | 12/1996 | Miller | 345/419 |
| 6,985,837 B2 | * | 1/2006 | Moon et al. | 703/3 |
| 7,746,343 B1 | * | 6/2010 | Charaniya et al. | 345/428 |
| 2006/0170693 A1 | * | 8/2006 | Bethune et al. | 345/568 |
| 2006/0197781 A1 | * | 9/2006 | Arutunian | 345/629 |
| 2006/0241859 A1 | * | 10/2006 | Kimchi et al. | 701/208 |
| 2008/0109483 A1 | * | 5/2008 | Yoo et al. | 707/104.1 |
| 2008/0129725 A1 | * | 6/2008 | Stambaugh | 345/419 |
| 2009/0073191 A1 | * | 3/2009 | Smith et al. | 345/629 |

* cited by examiner

*Primary Examiner* — Edward Martello
(74) *Attorney, Agent, or Firm* — Meunier Carlin & Curfman, LLC

(57) ABSTRACT

An interactive map may be provided. The map may include weather information such as temperature information, precipitation information, radar information, or the like, street information such as road information, traffic information, or the like, and/or advertising information for a particular area that may be chosen by the user. The map may also display information related to points of interest such as schools, golf courses, entertainment, or the like that may be chosen by the user. The map may be dynamic such that the weather information, street information, and/or advertising information may be dynamically updated on the map.

28 Claims, 28 Drawing Sheets
(18 of 28 Drawing Sheet(s) Filed in Color)

INTERACTIVE VIRTUAL WEATHER MAP

CROSS-REFERENCE TO RELATED APPLICATIONS

This application claims benefit under 35 U.S.C. §119(e) of U.S. Provisional Patent Application No. 61/005,416, filed on Dec. 4, 2007, the disclosure of which is incorporated herein by reference.

BACKGROUND

Currently, the Internet is one of the most popular mediums for receiving and viewing information such as news, weather, market analysis, advertisements, or the like. For example, many Internet patrons access weather information such as a 10-day forecast or a radar map that may indicate whether precipitation may be present in a particular area. Unfortunately, the available websites that host such weather information may not be interactive such that the user may pan, scan, and zoom on a particular area to receive more detailed weather information. Additionally, such available websites may not be dynamically updated to provide more accurate weather information as well as target advertising for the particular area the user may be interactively viewing.

SUMMARY

Disclosed herein are systems and methods for providing an interactive map. The interactive map may include weather information such as temperature information, precipitation information, radar information, or the like, street information such as road information, traffic information, or the like, and/or advertising information for a particular area that may be chosen by the user. The interactive map may also display information related to points of interests such as schools, golf courses, entertainment venues including amusement parks, restaurants, amphitheaters, zoos, historical sites, museums, ski resorts, airports, parks, or any other suitable points of interest. The interactive map may be panned, scanned, and/or zoomed to, for example, change the geographic areas that may be provided by the interactive map. According to one embodiment, the interactive map may be dynamically updated when the interactive map may be panned, scanned, and/or zoomed to a geographic area such that the weather information, street information, advertising information, and/or points of interest may be updated on the interactive map.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF ILLUSTRATIVE EMBODIMENTS

Figure 1:
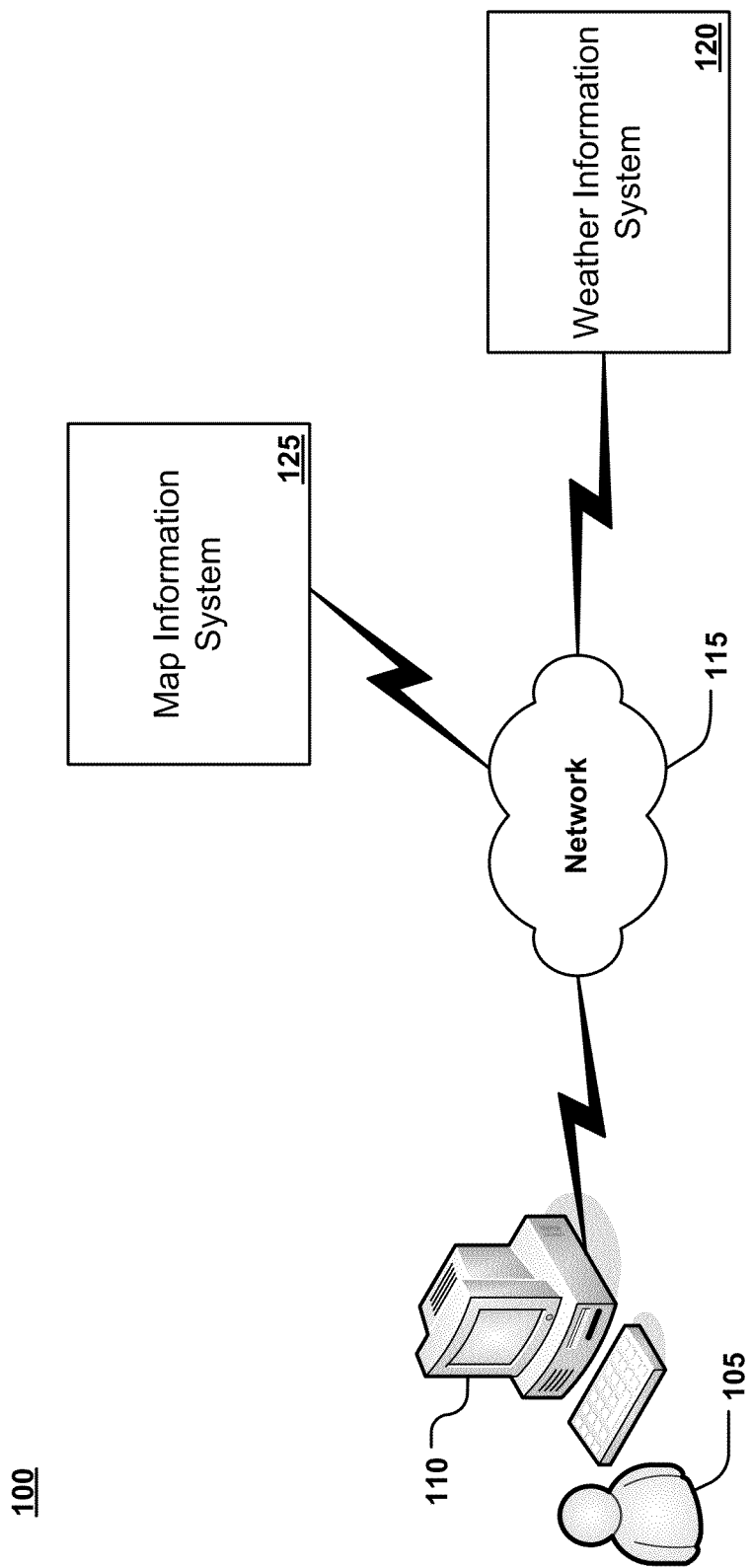
FIG. 1 depicts an example embodiment of a network configuration for providing an interactive map.

FIG. 1 depicts an example embodiment of a network configuration for providing an interactive map. As shown in FIG. 1, a weather information system 120 may be in operative communication with a map information system 125 and/or a user 105 via an electronic device 110. The weather information system 120, map information system 125, and electronic device 110 may be communicatively coupled via a network 115 that may include a Wide Area Network, a Local Area Network, a cable network, the Internet, or the like. The weather information system 120 may include any combination of hardware components such as processors, databases, storage drives, registers, cache, RAM memory chips, data buses, or the like and/or software components such as operating systems, database management applications, or the like, which will be described in more detail below. In an example embodiment, the weather information system 120 may be a network-based server that may receive weather information, format weather information, provide weather information to the electronic device 110, or the like such that an interactive map with the weather information may be provided to the user 105.

The map information system 125 may include any combination of hardware components such as processors, databases, storage drives, registers, cache, RAM memory chips, data buses, or the like and/or software components such as operating systems, database management applications, or the like. According to one embodiment, the map information system 125 may include a geospatial mapping platform that may include map imagery from satellite sensors, aerial cameras, 3-Dimensional (3-D) geographic models such as a 3-D city model, terrain model, a road model, or the like. The map information system 125 may also include real-time traffic information. In an example embodiment, the map information system 125 may also enable a developer to create an application such as an interactive map that may layer location-relevant data such as weather information, traffic information, points of interest, or the like over the map imagery provided by the geospatial mapping platform.

The user 105 may interact with the weather information system 120 using, for example, the electronic device 110. The electronic device 110 may include hardware components such as a processor, a graphics card, a storage component, a memory component, an antenna, a communication port, or the like. The electronic device 110 may also include software components such as an operating system, an application program, or the like that may control the hardware components. According to example embodiments, the electronic device 110 may be a computer, a portable music and/or video device, a telephone, a Personal Data Assistant (PDA), a server, or the like.

In one embodiment, the user 105 may interact with the electronic device 110 to access weather information and/or map information. For example, the user 105 may interact with a browser application, via the electronic device 110, to access an interface such as a web page that may include weather and/or map information provided by the weather information system 120.

Figure 2:
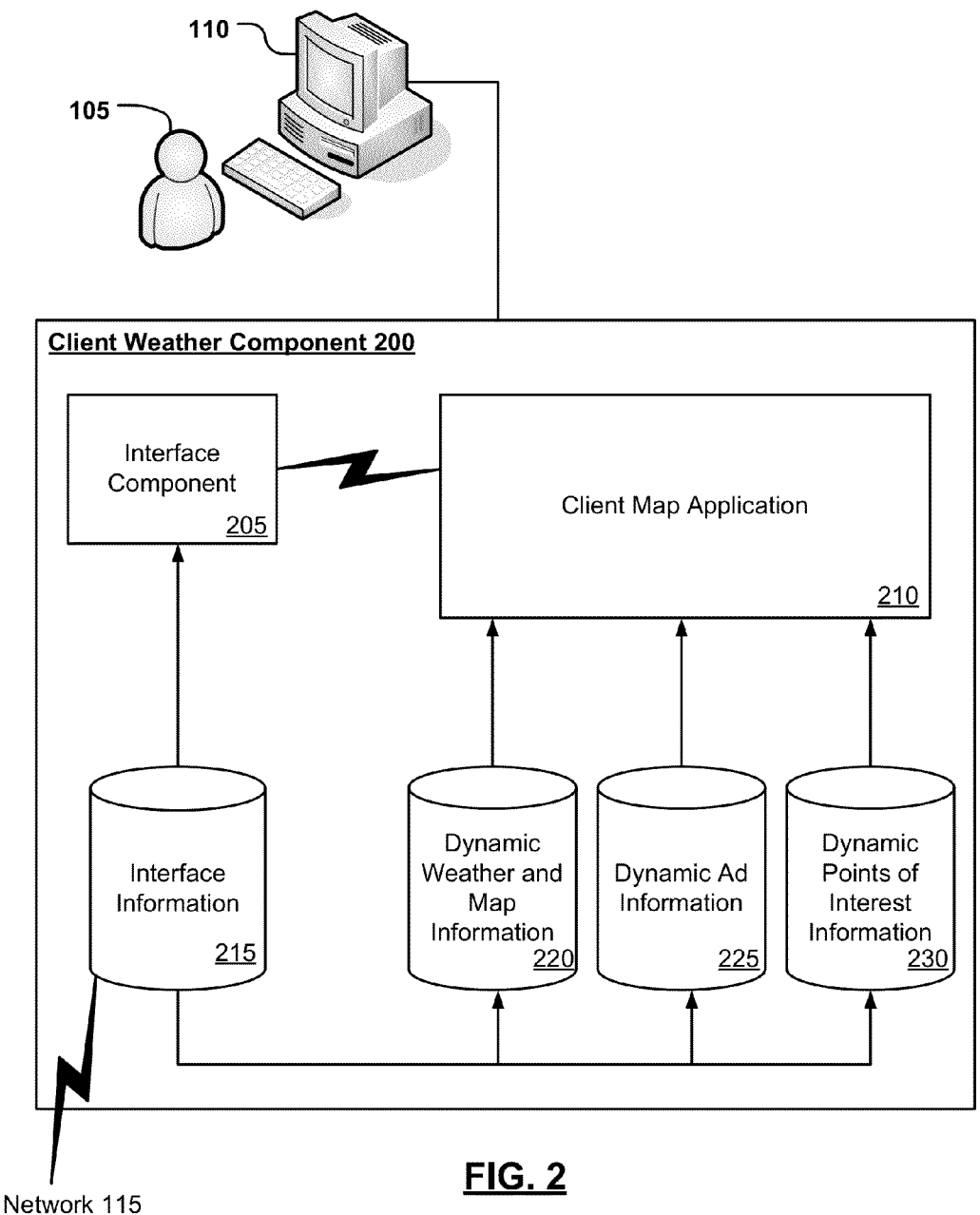
FIG. 2 depicts an example embodiment of a client weather component that may be included on an electronic device operated by a user.

FIG. 2 depicts an example embodiment of a client weather component that may be included on an electronic device that may be operated by a user. As shown in FIG. 2, a client weather component 200 may receive the weather and/or map information that may be provided by the weather information system 120 according to one embodiment. For example, the client weather component 200 may receive interface information 215 from the weather information system 120 via the network 115. The interface information 215 may include static and/or dynamic information including static and/or dynamic weather information, map information, points of interest information, ad information, or the like that may be displayed to the user 105.

In one embodiment, static information in the interface information 215 may be provided to the interface component 205. For example, static map information including, for example, a base map may be provided to the interface component 205. The interface component 205 may be an application such as a web browser application, a network-based desktop application, or the like operating on the electronic device 110. In an example embodiment, the interface component 205 may display an interface such as a web-page, user interface, or the like that may include the interface information 215 that may be provided by, for example, the weather information system 120. The user 105 may interact with the interface component 205 to, for example, access the interface that may include the interface information 215.

According to an example, the interface component 205 may be in communication with a client map application 210. The client map application 210 may include a Flash-based application, Java-based application, or the like that may be, for example, integrated into the interface that may be provided by the interface component 205.

The client map application 210 may provide animation and interactive functionality to, for example, dynamic information of the interface information 215 provided by the weather information system 120. For example, dynamic weather and map information 220, dynamic ad information 225, and/or dynamic points of interest information 230 may be provided to the client map application 210. The client map application 210 may then animate and/or provide interactive functionality to the dynamic weather and map information 220, the dynamic ad information 225, and/or dynamic points of interest information 230, which will be described in more detail below.

Figure 3:
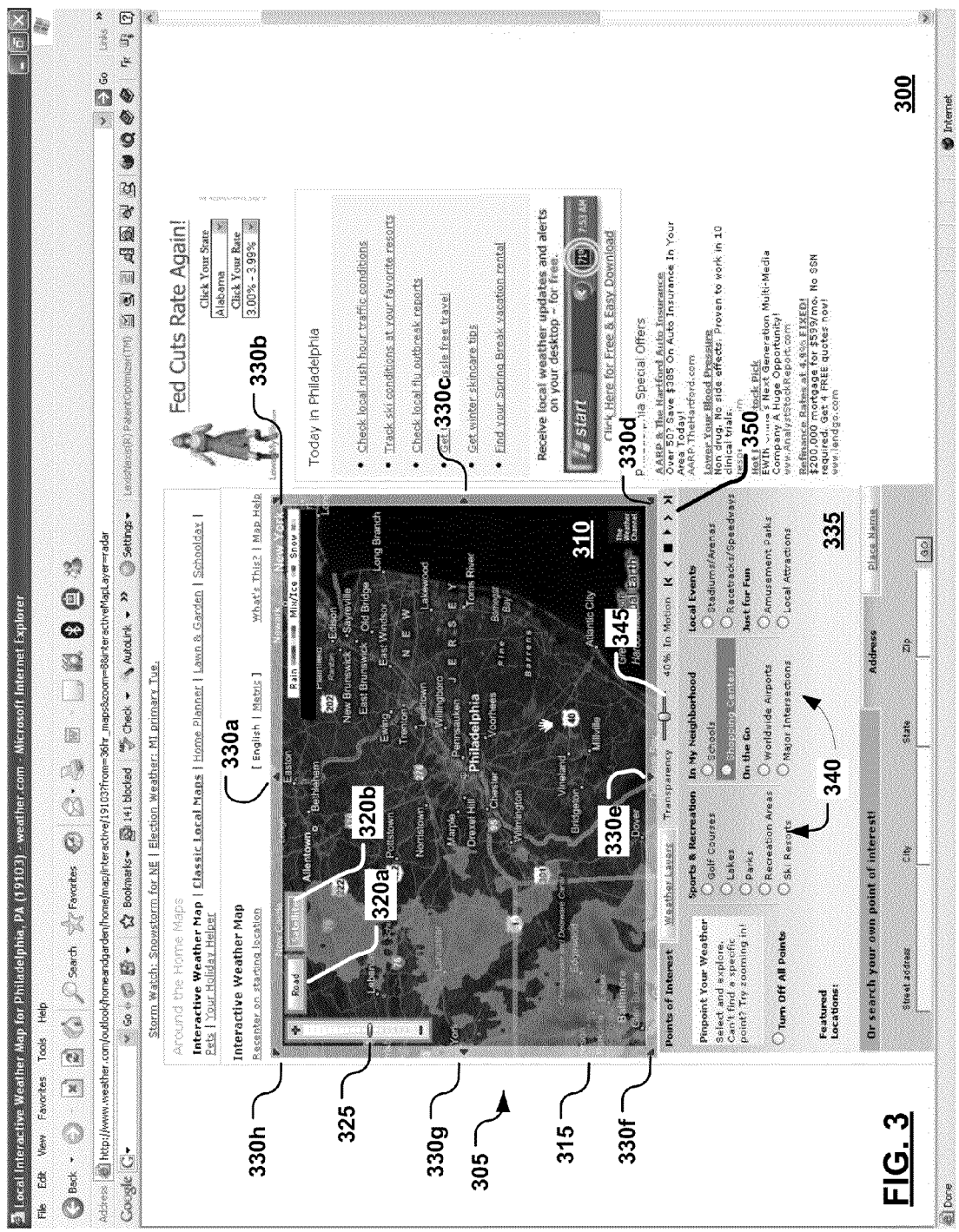
FIG. 3 depicts an example interface that may provide an interactive map.

FIG. 3 depicts an example interface that may provide an interactive map. As shown in FIG. 3, an interface 300 may be a web page, user interface, or the like that may be displayed via, for example, the interface component 205 shown in FIG. 2. According to an example embodiment, the user 105 may interact with the interface component 205 to access the interface 300. For example, as described above, the interface component 205 may include an application such as a web browser, client application, or the like. The user 105 may launch the application such that the interface 300 may be provided to the user 105. According to one embodiment, the user 105 may enter a geographic area such as a city, state, zip code, or the like prior to being provided with the interface 300. For example, a dialog box, a main interface such as a home page, or the like that may include an input box for a geographic area or location. The geographic area or location entered by the user 105 may be received by the weather map system 120. In one embodiment, the weather map system 120 may then provide the interface 300 based on the received geographic location.

According to an example embodiment, the interface 300 may include an interactive map 305. The interactive map 305 may include a base map 310 depicting the selected geographic area and may include, for example, an aerial map, a road map, or the like. The base map 310 may be provided in a viewport 315, which may be, for example, a window showing a portion of the map associated with the geographic area.

As shown in FIG. 3, the interactive map 305 may include base map toggles 320*a*, 320*b*. The base map toggles 320*a*, 320*b* may include interactive selection buttons that may be selected to, for example, change the base map 310. For example, the base toggle 320*a* may include a toggle to select a road map having road imagery as the base map 310. The base toggle 320*b* may include a toggle to select an aerial map having, for example, satellite imagery as the base map 310. Thus, according to example embodiments, the base toggles 320*a*, 320*b* may be selected to toggle the base map 310 between a road map and an aerial map respectively.

The interactive virtual map 305 may further include a zoom option 325 and pan options 330*a*-330*h* that may be provided to interact with the base map 310 and weather information that may be overlaid on the base map 310 in, for example, the viewport 315, as described in more detail below.

In an example embodiment, the interactive virtual map 305 may include a point of interest option area 335. The points of interest option area 335 may include one or more points of interest options 340 that may correspond to, for example, schools, golf courses, entertainment venues including amusement parks, amphitheaters, zoos, historical sites, museums, ski resorts, airports, parks, or any other suitable points of interest. Each of the points of interest options 340 may include an adjacent radio button that may be selected to display the selected points of interest on the base map 310. Upon selection one of the displayed points, a pop up interface may be displayed that may provide weather information associated with the selected point, as described in more detail below.

In an example embodiment, one of the point of interest options 340 may include a "Schools" option. The radio button adjacent to the "Schools" option may be selected such that points may be displayed on the base map 310 that correspond to locations of schools in the geographic area of the interactive map 305. According to one embodiment, a user such as the user 105 may select or click one of the displayed points associated with a particular school such that weather information for that particular school may be displayed in a pop up interface, which will be described in more detail below.

The interactive virtual map 305 may further include weather information (shown in colors) overlaid over the base map 305. The weather information may include an indication of precipitation, cloud coverage, or the like for the geographic area displayed.

In one embodiment, the weather information may be adjusted. For example, a transparency option 345 and an animation control panel 350 may be provided by the interactive map 305. The transparency option 345 may include a slider that may be adjusted to increase and/or decrease transparency of the weather information. As shown in FIG. 3, the transparency option 345 may include a bar that may slide along a visible line. To interact with the transparency option 345, a user such as the user 105 may drag the bar, for example, in a left direction or a right direction to select a desired value of the transparency between a minimum and maximum value for the weather information overlaid on the base map 310.

The animation control panel 345 may include playback controls that may be used to, for example, play, pause, rewind, fast forward, or the like weather information that may be provided on the interactive map 305. According to one embodiment, the weather information may include real-time information that may be animated from, for example, a past point in time until a present point in time. For example, the weather information may be animated during a time span of an hour. The weather information may then be animated for the past hour. The hour may then be continuously updated such as the current weather information may be provided at the end of the hour being animated.

FIGS. 4A-4D depict an example embodiment of an interactive virtual map that may include pan options. As described above with respect to FIG. 3, the interactive map 305 may include the base map 310, weather information (shown in colors) overlaid on the base map 310, and the pan options 330a-3330h that may be selected to panned to different geographic areas, which will be described in more detail below.

Figure 4A:
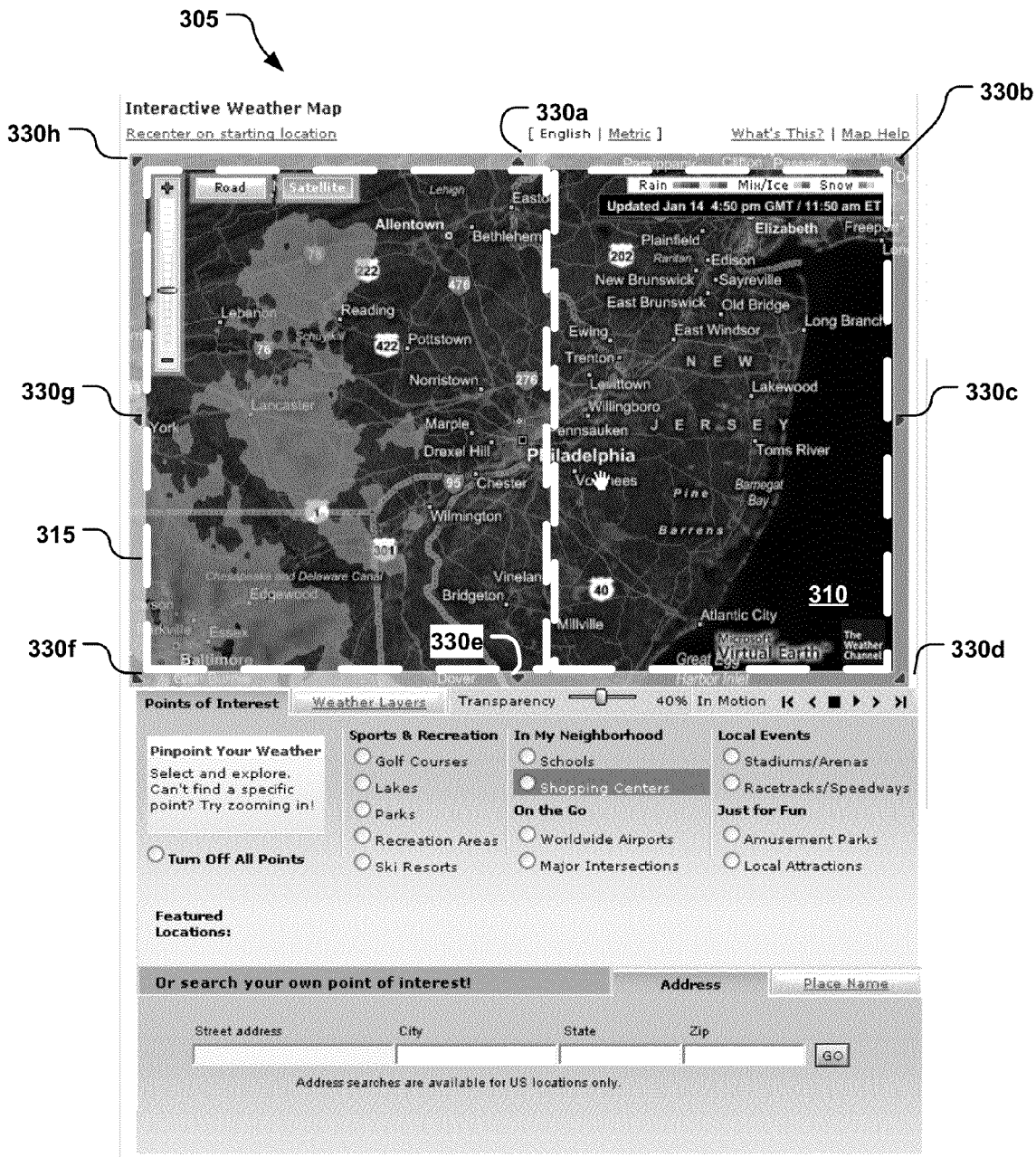
FIGS. 4A-4D depict an example embodiment of an interactive map providing a pan option.
Figure 4B:
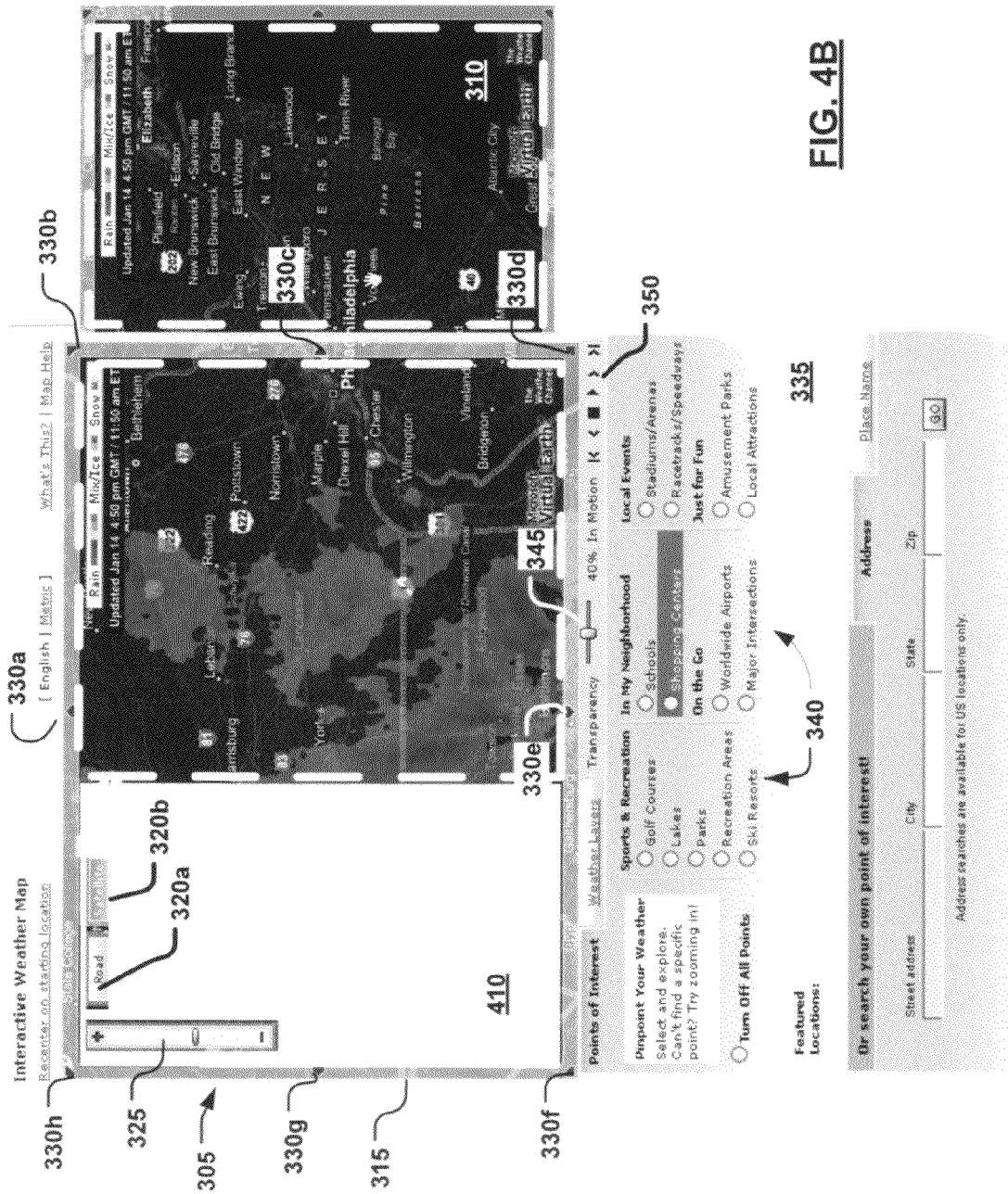
Figure 4C:
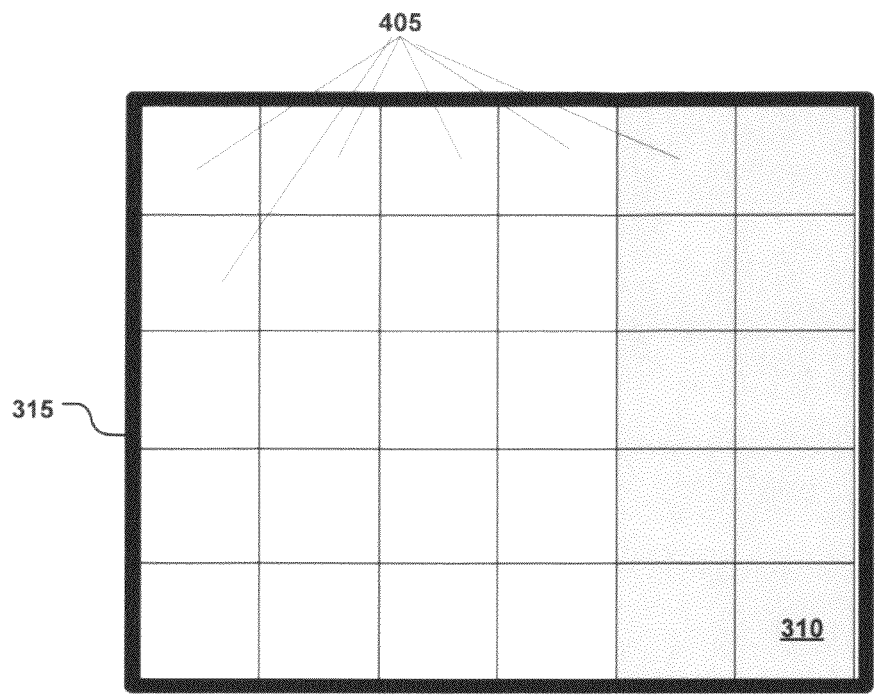
Figure 4D:
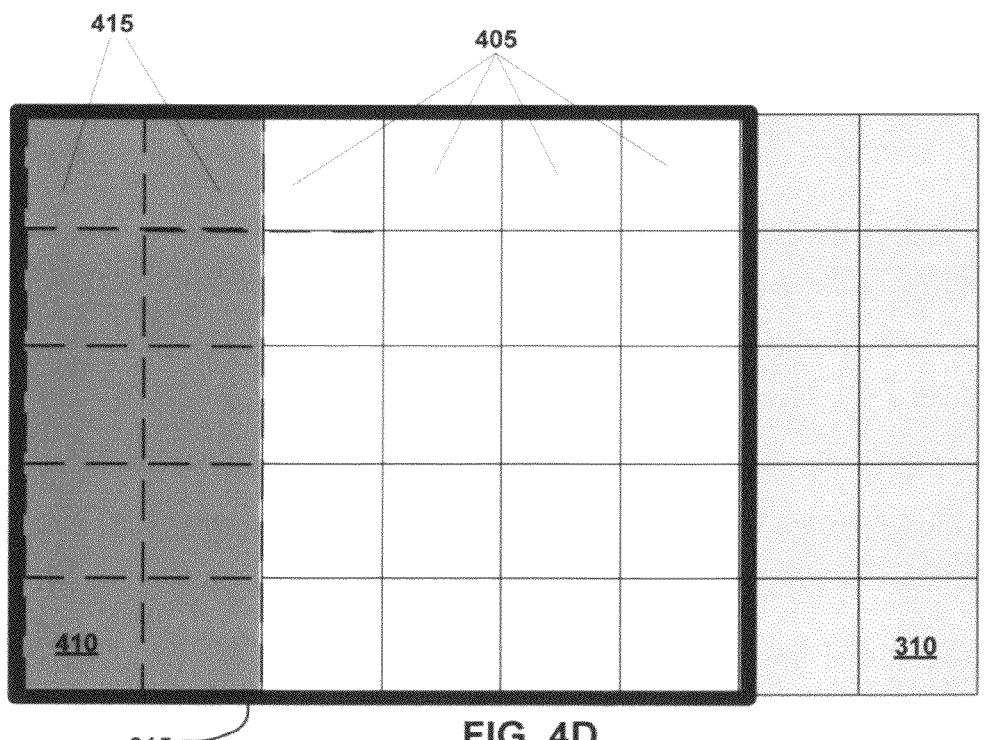

Referring to FIGS. 4C and 4D, according to an example embodiment, the base map 310 and/or weather information may include a plurality of tiles 405. Each of the plurality of tiles 405 may define a portion of a geographic area of the base map and/or weather layers such that when the plurality of tiles 405 corresponding to the area or region are rendered the base map 310 may be formed. For example, the plurality of tiles 405 may be mapped to a particular portion of a geographic area of the base map and/or the weather layers. When the base map 310 is provided in the viewport 315, the tiles mapped to that particular portion of the geographic area may be rendered. Each of the plurality of tiles 405 may be, for example, a small rectangular, square, or hexagonal graphical image for a portion of the base map 310 and/or the weather layers. As shown in FIGS. 4C-4D, each of the plurality of tiles 405 may be rendered adjacent to a respective tile in, for example, a grid to form the base map 310 and/or the weather layers in the viewport 315.

According to an example embodiment, the plurality of tiles 405 may be stored in, for example, an array. The array may be a data structure that may include the plurality of tiles 405 indexed, for example, by the location of the tile with respect to the base map 310 and/or the weather information.

Figure 5:
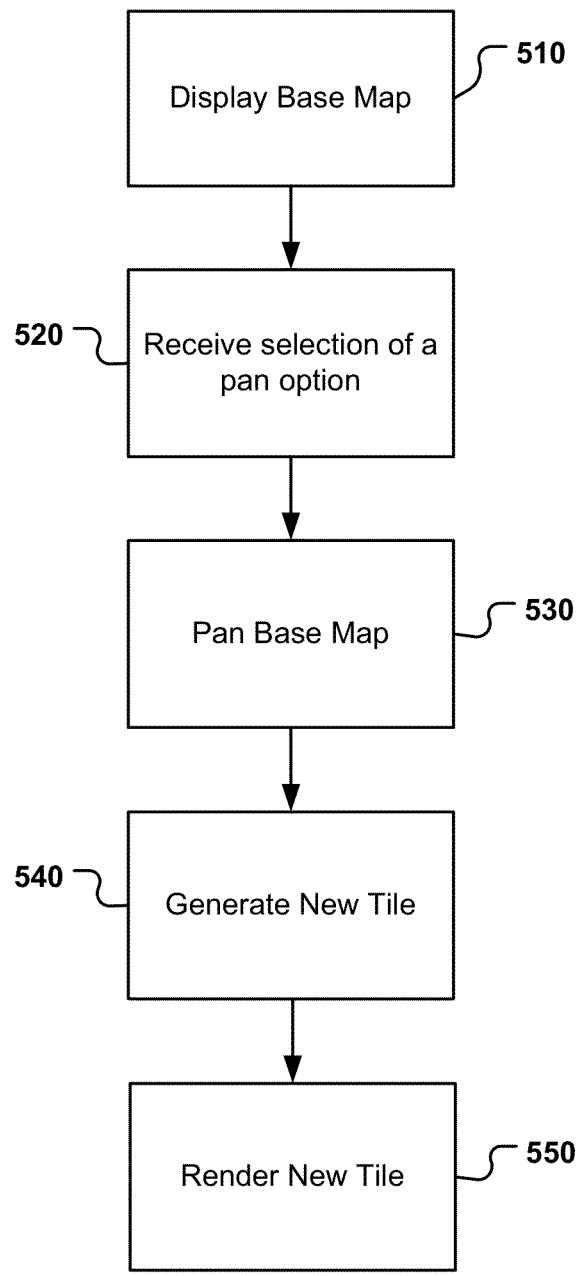
FIG. 5 depicts a flow diagram of an example method for generating tiles associated with an interactive map that may provide a pan option.

FIG. 5 depicts a flow diagram of an example method for generating tiles associated with an interactive map that may provide a pan option. At 510, a base map such as the base map 310 may be displayed. As described above, the base map may be displayed via an interface such as the interface 300 via an electronic device such as the electronic device 110. In an example embodiment, the base map may include the plurality of tiles 405, shown in FIGS. 4A-4D. The interactive map may also provide the pan options 330a-330h described with respect to FIG. 3. In an example embodiment, a user may select one of the pan options 330a-330h to scroll to a different part of the base map. For example, according to one embodiment, the user may click on one of the pan options 330a-330h by positioning a cursor over one of the pan options 330a-330h and activating the cursor. Alternatively, the user may drag the base map 310 to pan to a different geographic area by, for example, activating a cursor and dragging the activated cursor within the viewport 315 of the interactive map 305.

At 520, a selection of the pan option may be received. For example, an indication associated with the selection of one of the pan options 330a-330h and/or a drag interaction may be received. In an example embodiment, the indication may be received by the client weather component 200 described with respect to FIG. 2. Alternatively, the selection of the pan option may be received by the weather information system 120. Referring to FIGS. 4A-4D, a selection of the pan option 330c may be received by, for example, the client weather component 200 or the weather information system 120.

Upon receiving the indication of the selection of a pan option at 520, the base map may be panned in the appropriate direction at 530. For example, upon receiving the indication of the selection of a pan option, the base map 310 and/or weather information overlaid thereon may be moved in the direction of the pan option selected within the viewport. According to one embodiment, a blank portion that may include one or more blank tiles may be exposed in the viewport in the direction the base map and/or weather information may be panned.

As shown in FIGS. 4A-4B, upon receiving an indication of the selection of the pan option 330c at 520, the base map 310 and/or weather information may be panned in the direction of the selected pan option 330c at 530. For example, the base map 310 and/or weather layers may be panned in an east or right direction upon receiving a selection of the pan option 330c. Additionally, as shown in FIGS. 4B-4D, a blank portion 410 that may include one or more blank tiles 415 may be exposed within the viewport 315 in the direction of the panning.

At 540, a new tile may be generated to replace the blank portion exposed when, for example, the base map is panned at 530. As described above, the plurality of tiles may be stored in, for example, an array. According to one embodiment, the array may include a size corresponding to the number of tiles that may fill the viewport. To generate a new tile, the tiles panned out of the viewport may be discarded from the array and the remaining tiles may be shifted such that blank tiles may be exposed in the viewport. The new tiles may then be generated to fill, for example, the blank tiles by for example receiving the appropriate tiles from the weather information system. According to an example embodiment, the new tiles may be generated sequentially. For example, a column of the new tiles may be calculated, followed by a row, or vice-versa.

At 550, the new tile may be rendered within the viewport. For example, the new tiles in the array may be rendered within the viewport on such that the base map may be formed. Thus, in one embodiment, at 550, the new tiles for the base map may be rendered within the viewport such that the blank tiles may be filled. Referring to FIGS. 4C-4D, the new tiles may be rendered within the viewport 315 to fill, for example, the blank tiles 415 at 550.

FIGS. 6A-6E depict an example embodiment of an interactive map providing a zoom option. As described above with respect to FIG. 3, the interactive map 305 may include the base map 310, weather information overlaid on the base map 310, and the zoom option 325 that may be selected to scale down a geographic area within the viewport 315 and/or to scale up a geographic area within the viewport 315.

As described above, the base map 310 and/or weather information may include a plurality of tiles 405. The plurality of tiles 405 may define a portion of the geographic area of the base map and/or weather information such that when the plurality of tiles 405 corresponding to the area or region may be rendered, the base map 305 and/or the weather information overlaid over the base map 310 may be formed. Additionally, the plurality of tiles 405 may define a zoom layer 605 of the base map 310 and/or the weather information within the viewport 315. Thus, in one embodiment, the zoom layer 605 may include the plurality of tiles 405 at a particular zoom level of a geographic area.

Figure 6A:
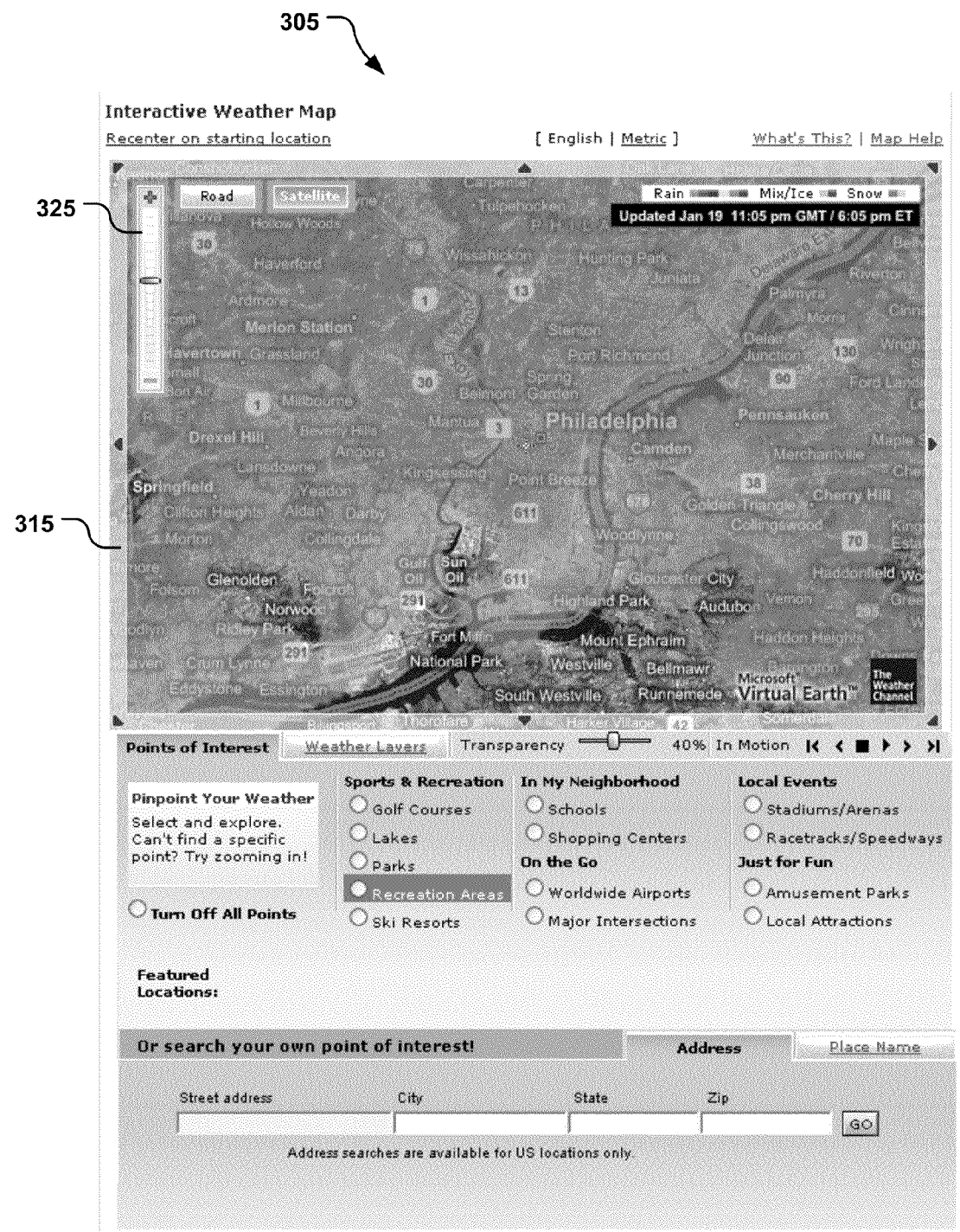
FIGS. 6A-6E depict an example embodiment of an interactive virtual map providing a zoom option.
Figure 6B:
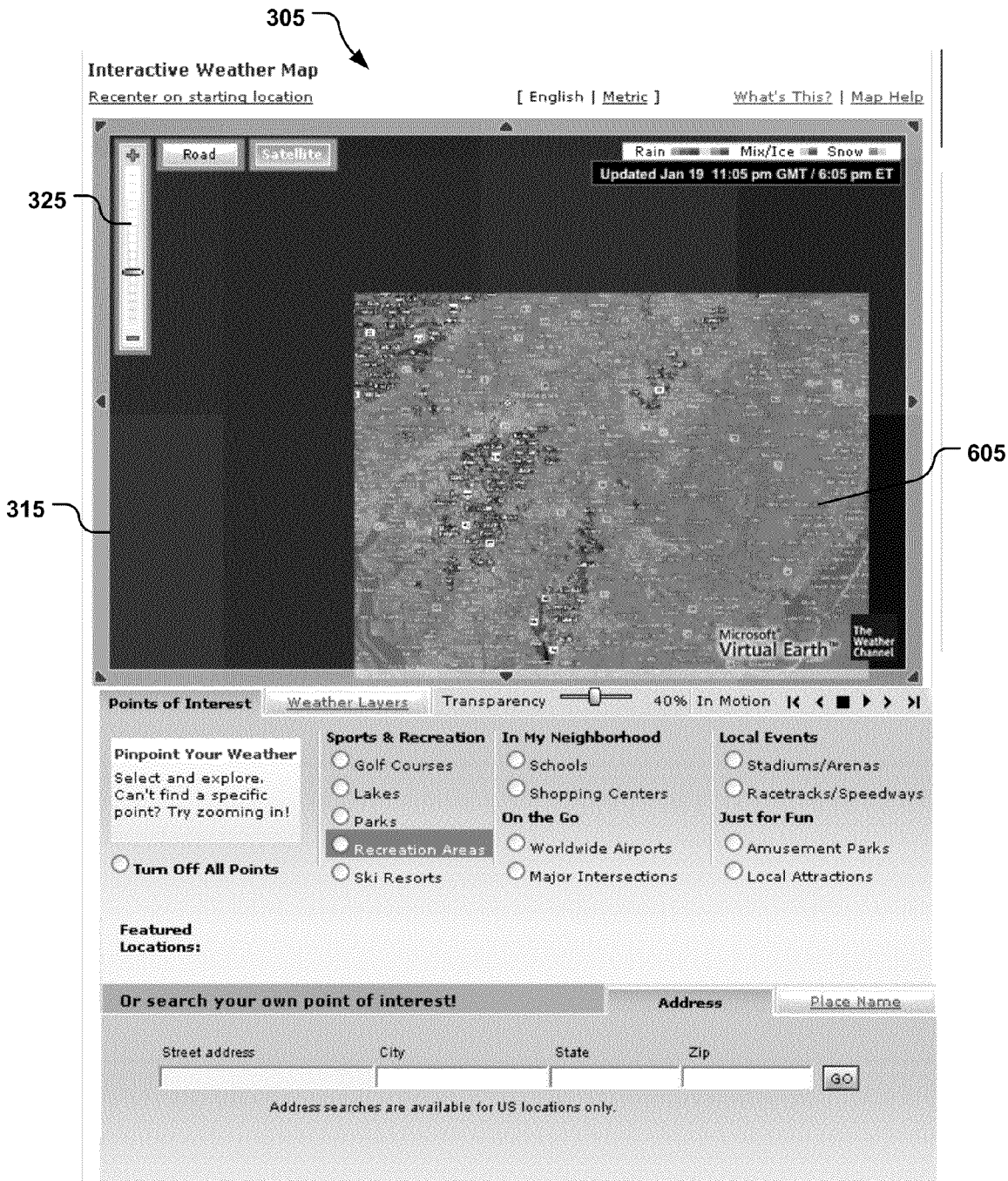
Figure 6C:
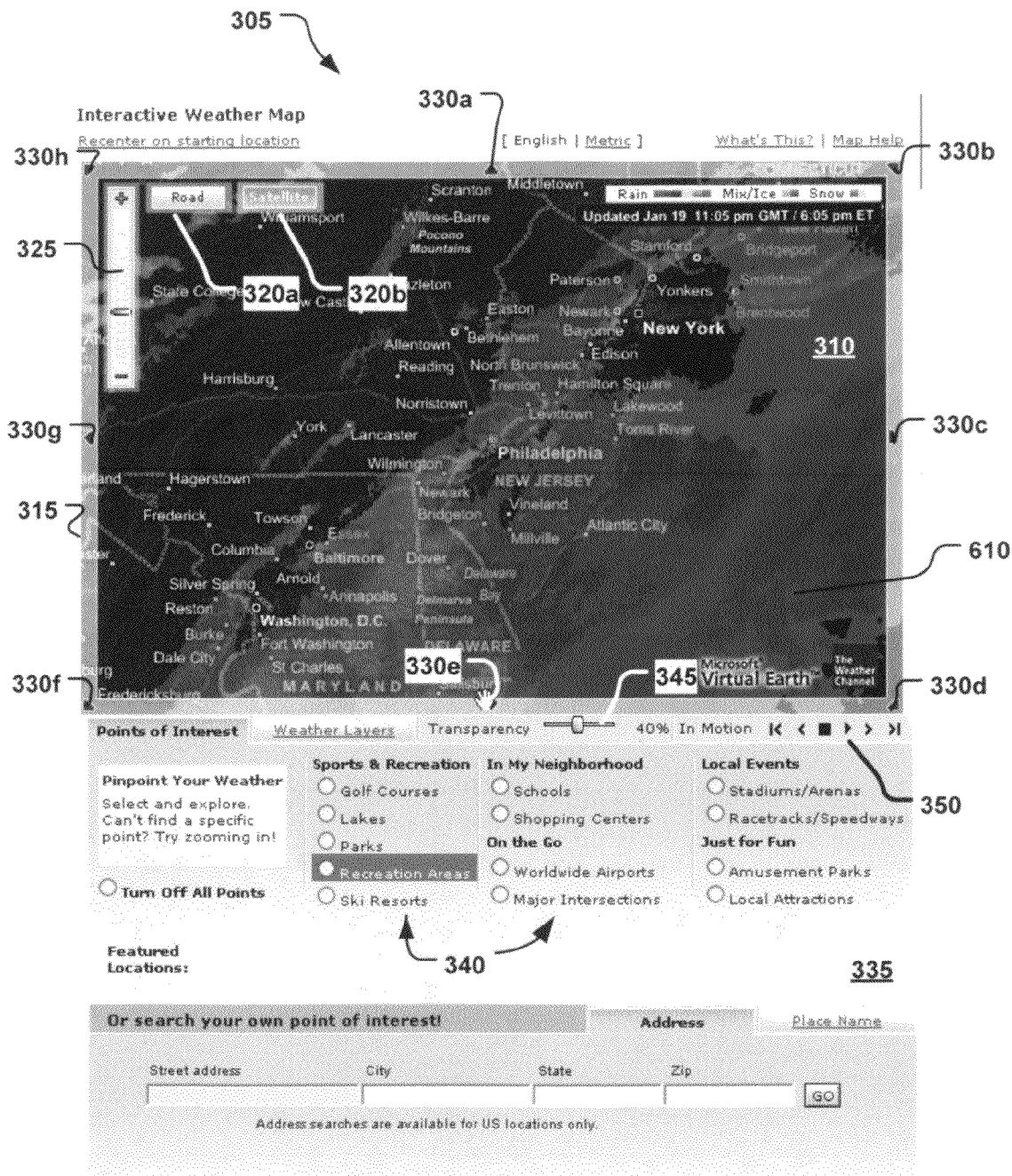
Figure 6D:
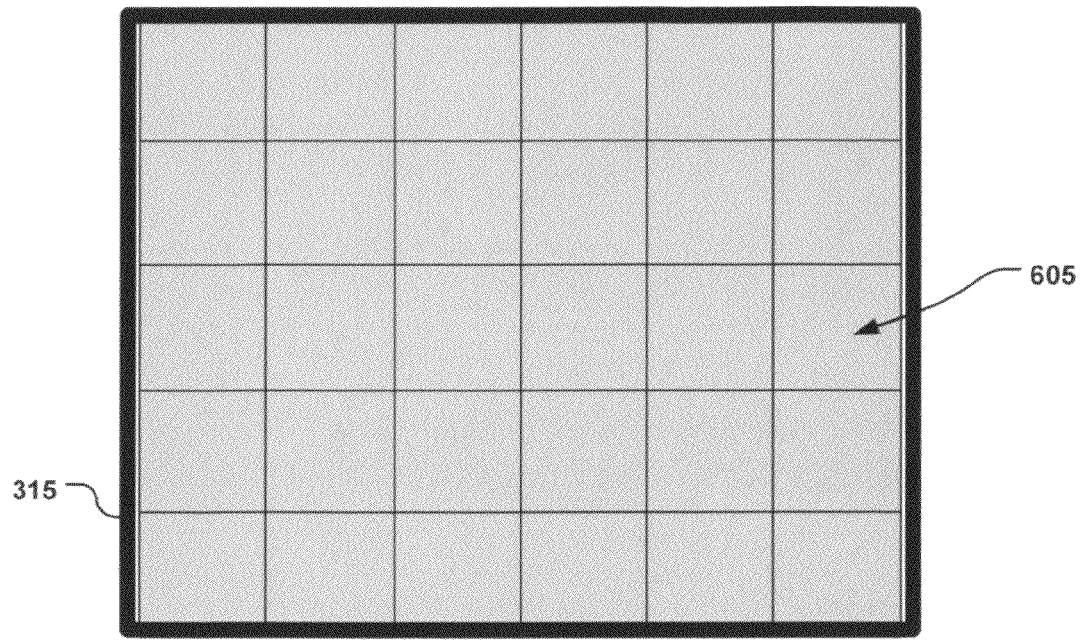
Figure 6E:
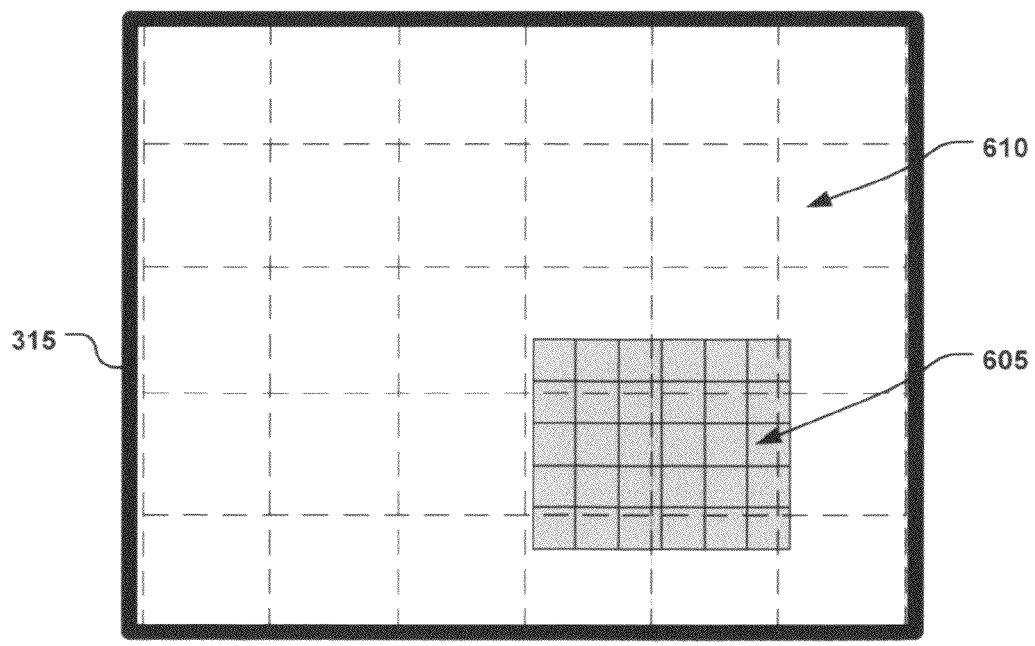
Figure 7:
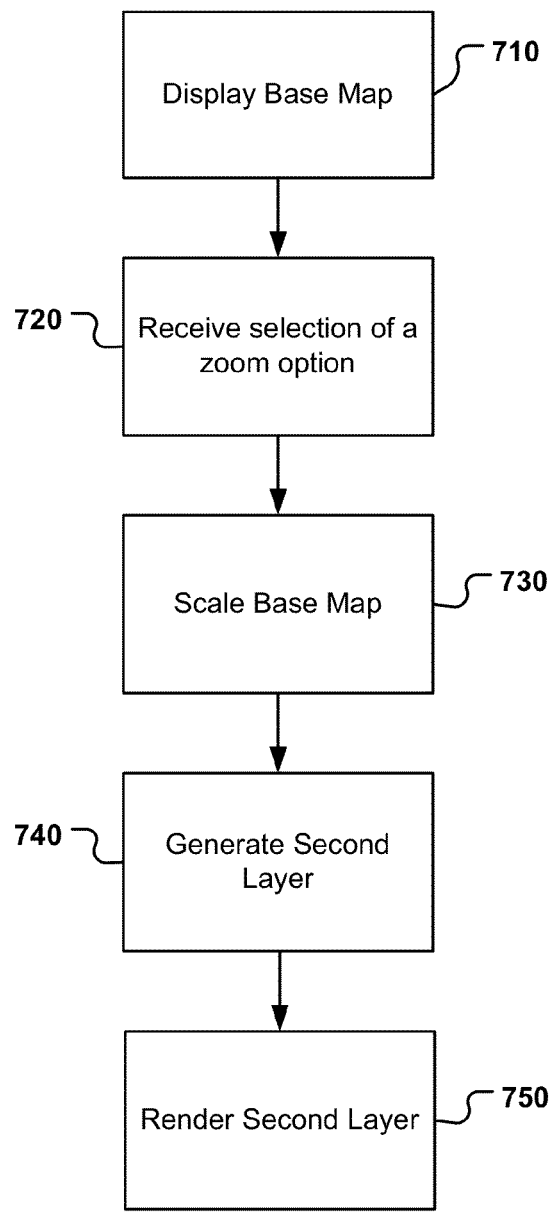
FIG. 7 depicts a flow diagram of an example method for generating tiles associated with an interactive map that may provide a zoom option.

FIG. 7 depicts a flow diagram of an example method for generating tiles associated with an interactive map that may provide a zoom option. At 710, a base map such as the base map 310 may be displayed. As described above, the base map may be displayed via an interface such as the interface 300 via an electronic device such as the electronic device 110. In an example embodiment, the base map may include the plurality of tiles 405, shown in FIGS. 6A-6E. Additionally, the plurality of tiles 405 may be define a zoom layer of the base map with a viewport such as the viewport 315 that may include the base map The interactive map may also provide a zoom option such as the zoom option 325 described with respect to FIG. 3. In an example embodiment, a user may select the zoom option to scale down and/or up the base map within the viewport. For example, the user may select a plus or minus indicator of, for example, the zoom option 325 to scale up or down the base map within the viewport. According to one embodiment, the user may select the zoom option by positioning a cursor over the plus or minus indicator and activating the cursor.

At 720, a selection of the zoom option may be received. For example, an indication associated with the selection of the plus or minus indicator of the zoom option 325 may be received. In an example embodiment, the indication may be received by the client weather component 200 described with respect to FIG. 2. Alternatively, the indication may be received by the weather information system 120. Referring to FIGS. 6A-6E, a selection of the plus indicator of the zoom option 325 may be received by, for example, the client weather component 200 or the weather information system 120 at 520.

Upon receiving the indication of the selection of the zoom option at 720, the base map and/or the weather information may be scaled up or down at 730. For example, upon receiving the indication of the selection of the plus or minus indicator of the zoom option, the base map and/or weather information may be scaled up in the viewport if, for example, the plus indicator of the zoom option may be selected or the base map and/or weather information may be scaled down in the viewport if, for example, the minus indicator of the zoom option may be selected. According to one embodiment, when scaling base map up and down, the prior zoom layer, or first zoom layer, may be visible within the viewport.

As shown in FIGS. 6A-6B, upon receiving an indication of the selection of, for example, the minus indicator of the zoom option 325 at 520, the base map 310 and/or weather information may be scaled down at 730 as shown in FIG. 6B. For example, the first zoom layer of the base map 310 and/or weather information may be scaled down as shown in FIG. 6B.

At 740, a new zoom layer, or a second zoom layer, may be generated to replace the first zoom layer. As described above, the plurality of tiles may define the base map and/or the weather information that may be provided in the viewport of the interactive map. According to one embodiment, the plurality of tiles may define a zoom layer within the viewport. When the zoom layer within the viewport of the interactive map is scaled up or scaled down, a plurality of tiles may be generated to define a new, or second, zoom layer. The new, or second zoom layer, may then replace the prior, or first, zoom layer. For example, as described above, the plurality of tiles may be stored in an array. The plurality of tiles for the prior, zoom layer may be replaced with the plurality of tiles for the new, or second zoom layer in the array such that upon replacing the plurality of tiles in the array the new, or second, zoom layer may be superimposed over the prior, or second, zoom layer. Thus, according to one embodiment, the plurality of tiles for the prior, or first, zoom layer may be maintained until the plurality of tiles for the new, or second, zoom layer may be generated.

At 750, the new, or second, zoom layer may be rendered over the prior, or first, zoom layer tile may be rendered within the viewport. For example, the plurality of tiles for the new, or second, zoom layer in the array may be rendered over the plurality of tiles for the prior, or first, zoom layer. Referring to FIGS. 6D-6E, a new, or second, zoom layer 610 may be rendered over the prior, or first, zoom layer 605 at 750.

Figure 8A:
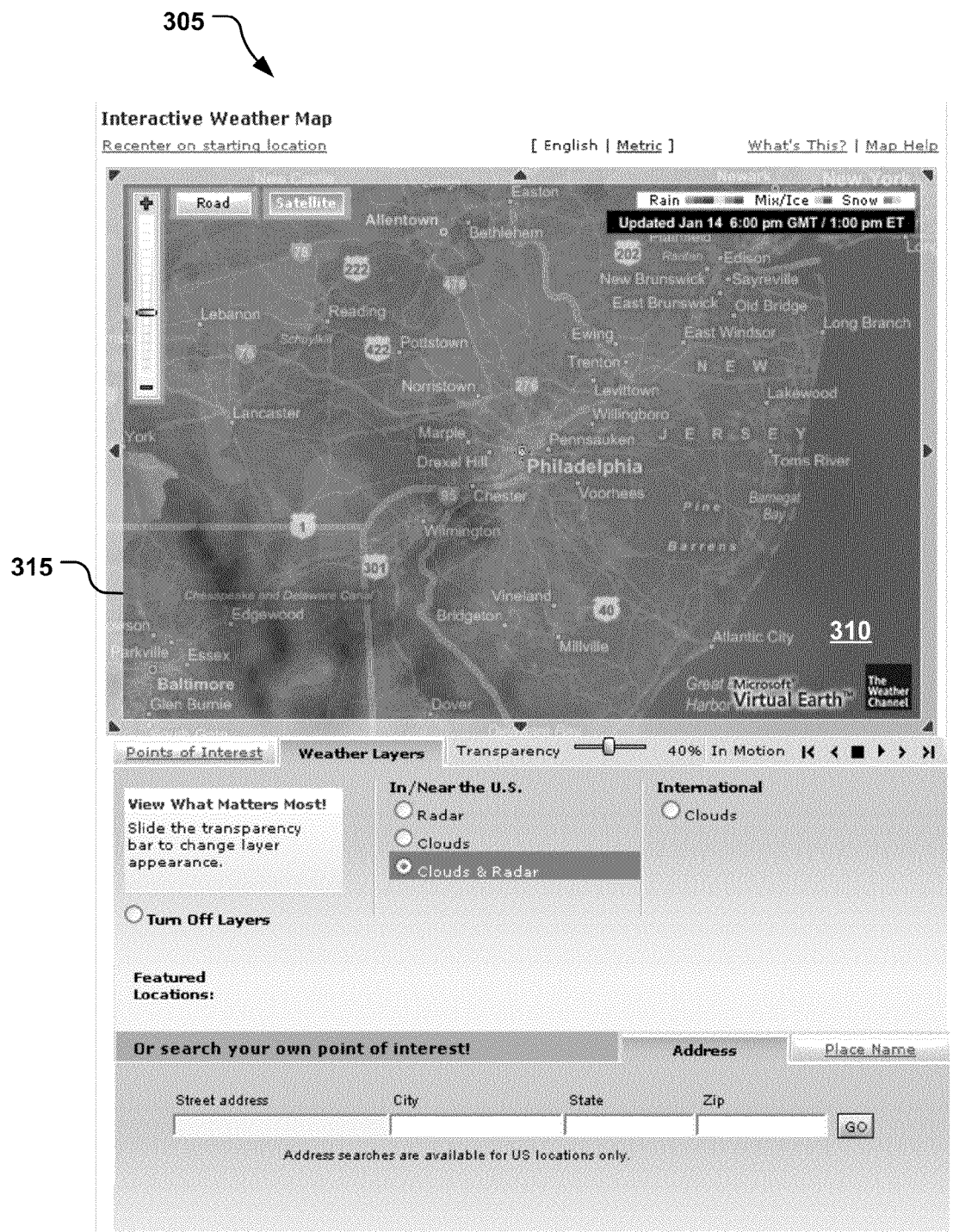
FIGS. 8A-8B depict an interactive virtual map that may include a weather layer.
Figure 8B:
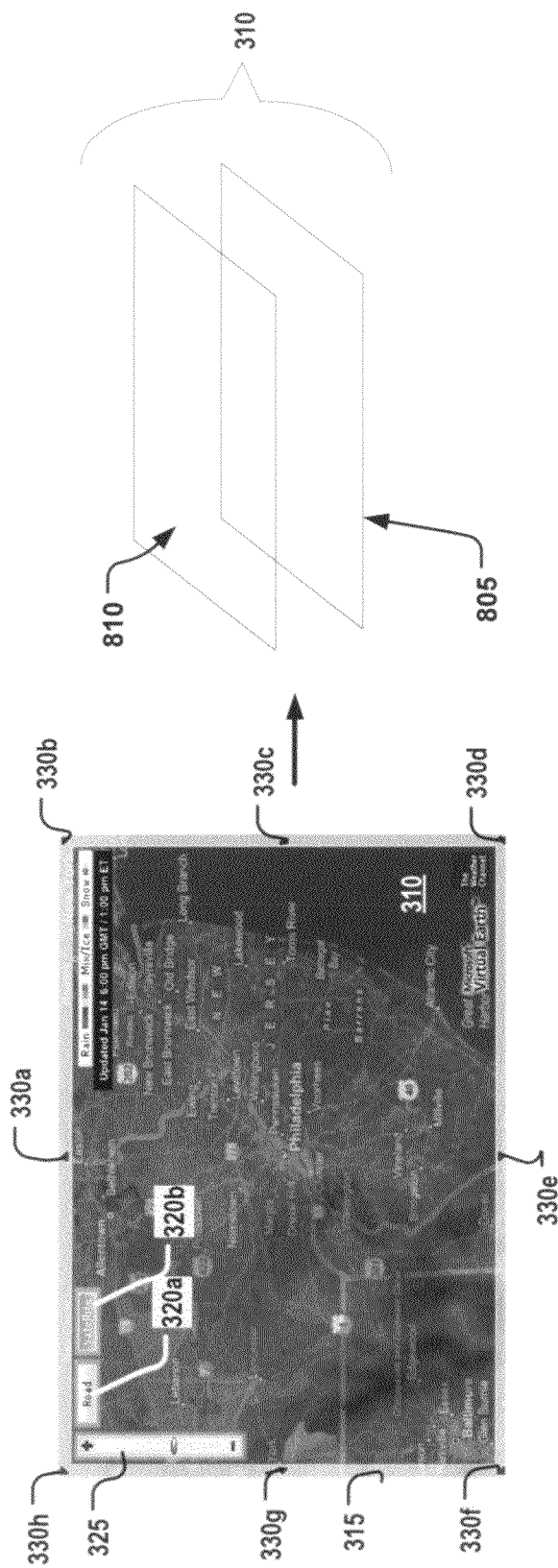

FIGS. 8A-8B depict an interactive map that may include a weather layer. As described above, weather information such as radar information, cloud information, or the like may be provided on the interactive map 305. As shown in FIGS. 8A-8B, the weather information may include dynamic or real-time weather information that may be overlaid on the base map 310. For example, the interactive may include a first layer 805 such as the base map 310 described above and a second layer 810 such as the weather information described above. In one embodiment, the weather information may be included in, for example, the interface information 215. Additionally, the second layer 810 may be transparent over the first layer 805, which will be described in more detail below.

Figure 9:
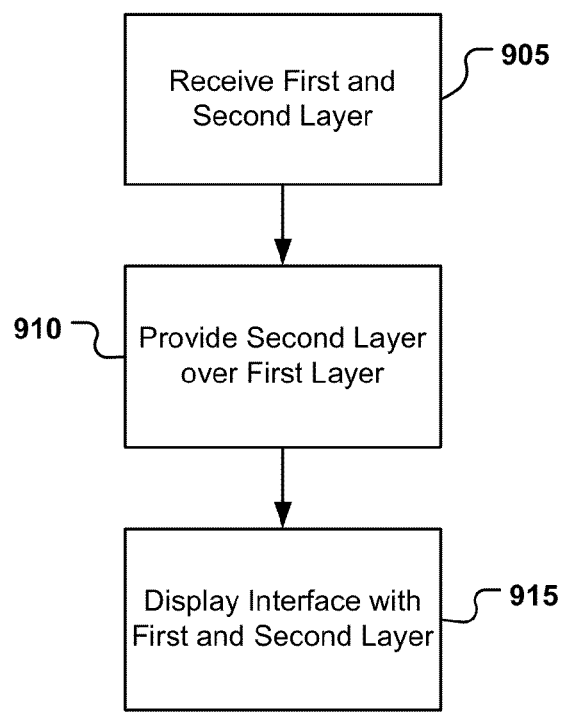
FIG. 9 depicts a flow diagram of an example method for providing an interactive map that may include a weather layer and a points of interest layer.

FIG. 9 depicts a flow diagram of an example method for providing an interactive map that may include a weather layer. At 905, a first layer and a second layer may be received. The first layer may include a base map such as the base map 300 described above and the second layer may include real-time information such as weather information. According to one embodiment, the first layer and second layer may be received by the client weather component 200. Alternatively, the first and second layer may be received via the weather information system 120.

At 910, the second layer may be provided over the first layer. For example, weather information layer may be overlaid or provided over on the first layer. According to an example embodiment, the second layer may be provided over the first layer such that the second layer may be transparent over the first layer.

As shown in FIGS. 8A-8B, the second layer 810 that may include, for example, the weather information may be provided over the first layer 805 that may include, for example, the base map 300. The second layer 810 may be transparent over the first layer 805 such that the first layer 805 may still be visible with the second layer 810 overlaid thereover.

At 915, an interface that may include the first layer and the second layer may be displayed. For example, an interface such as the interface 300 may be displayed. The interface may include the second layer provided over the first layer.

As described above, the second layer may include real time information such as real time weather information. According to an example embodiment, the second layer may be suspended in response to at least a portion of a new first layer being received. For example, the interface may include an interactive map such as the interactive map 305 described above. The interactive map may include the first layer, the second layer, and an interactive option. The interactive option may include, for example, a pan option, a zoom option, or the like described above. Upon selection of the interactive option, the second layer may be suspended until a new first layer corresponding to the appropriate selection may be received.

According to one embodiment, additional layers such as a point of interest layer, an advertisement layer, or the like may be provided over the first layer and the second layer. For example, at 905, a third layer may also be received along with the first layer and the second layer. The third layer may then be provided over, for example, the second layer and the third layer at 910. At 915, the interface may be provided with the first layer, the second layer, and the third layer.

Figure 10A:
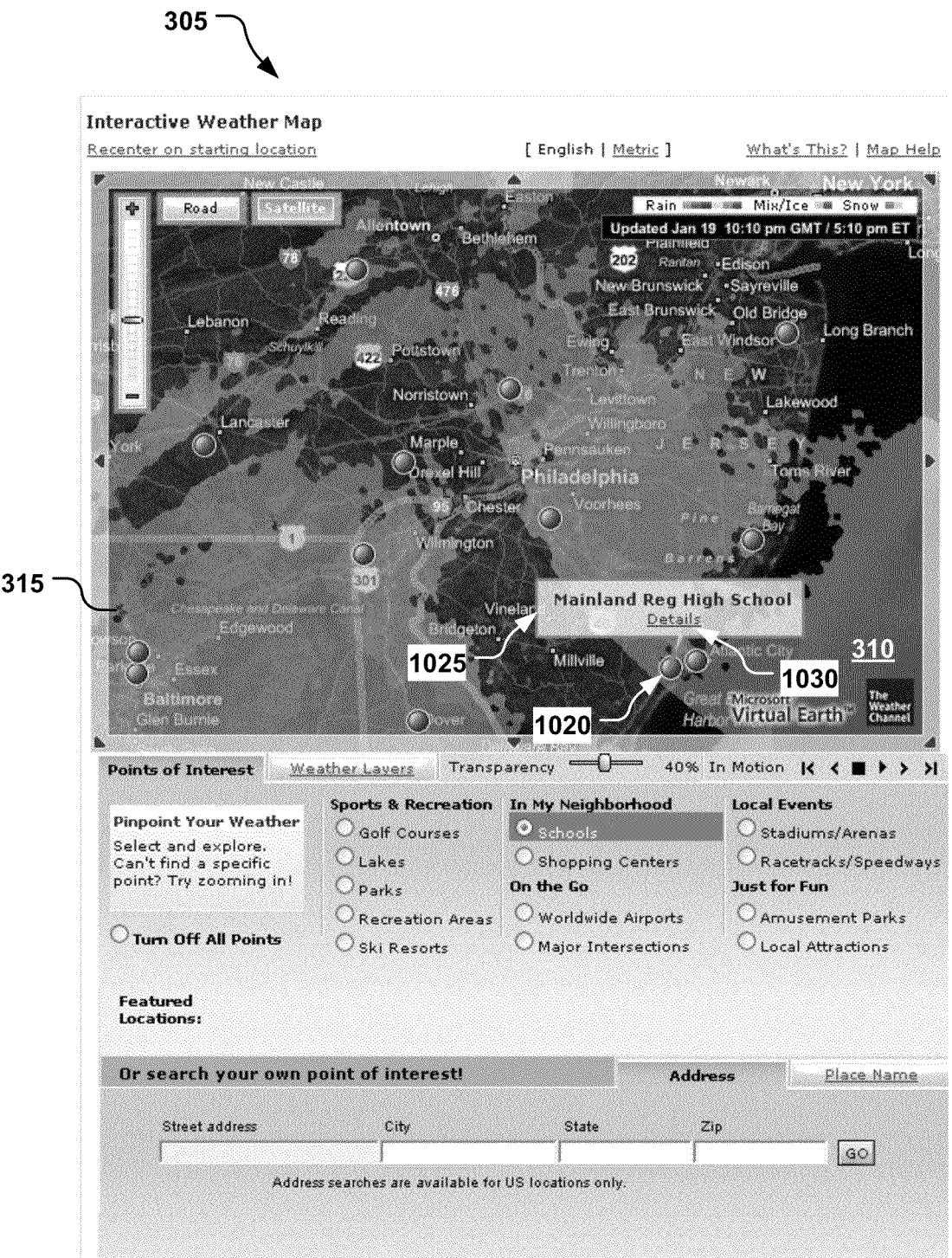
FIGS. 10A-10C depict an interactive map that may include a weather layer and a point of interest.
Figure 10B:
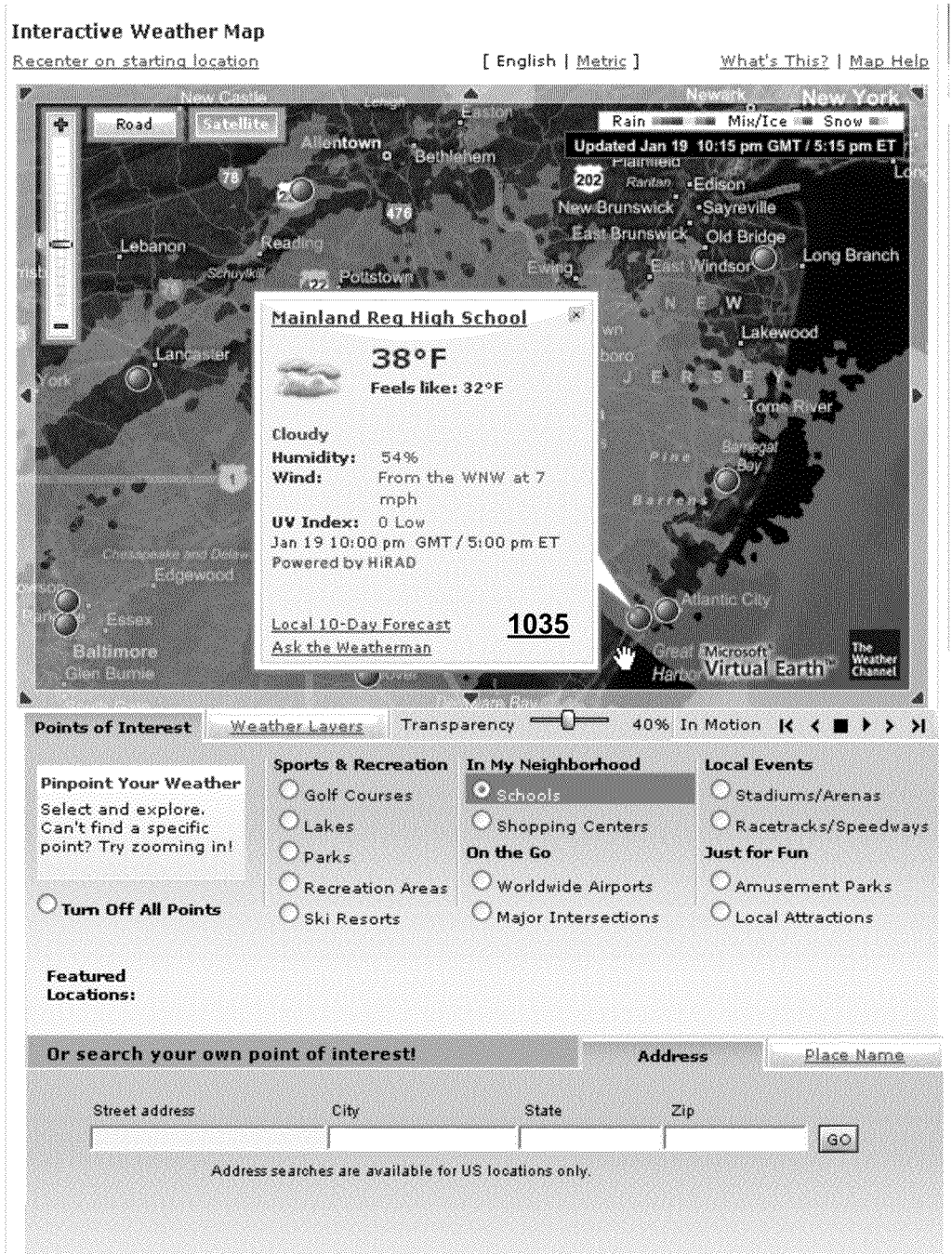
Figure 10C:
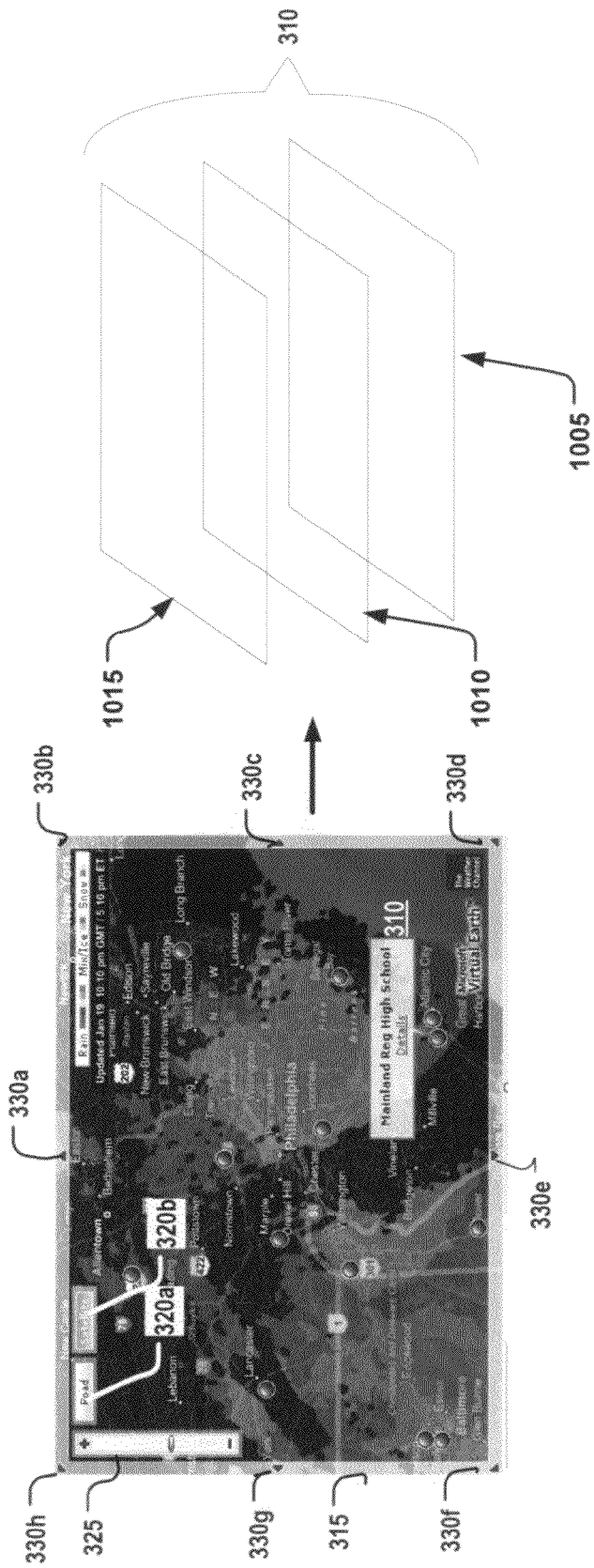

FIGS. 10A-10C depict an interactive virtual map that may include a weather layer and points of interest layer. As described above, points of interests may also be provided on the interactive map 305. As shown in FIGS. 10A-10C, the points of interest may include, for example, schools, golf courses, entertainment venues including amusement parks, amphitheaters, zoos, historical sites, museums, ski resorts, airports, parks, or any other suitable points of interest. In one embodiment, the points of interest may be overlaid over the base map 310 and/or the weather information. For example, the interactive may include a first layer 1005 such as the base map 310 described above, a second layer 1010 such as the weather information that may be included in, for example, the interface information 205, and a third layer 1015 such as points of interest. In one embodiment, the third layer 1015 may include points that may be overlaid over the first layer 1005 and the second layer 1010. Alternatively, the third layer 1015 may include points that may be overlaid over the first layer 1005. The second layer 1010 may then be overlaid over the first layer 1005 and third layer 1015.

In one embodiment, the points that may be included as part of the third layer 1015 may be interactive. As shown in FIG. 10A, a user such as the user 105 may interact with an input device such as a mouse, touch screen, or the like electrically coupled to, or integrated in, the electronic device 110 to select a point. For example, the user may position the cursor over one of the points of interest by interacting with the input device to select a point 1020. Upon positioning the cursor over the point 1020, a window 1025 may appear over the point 1020 such that the name of the point 1020 and a link 1030 may be provided. The link 1030 that may provided in the window 1025 may be selected by, for example, clicking the link 1030 to view additional information regarding the selected point 1020. As shown in FIG. 10B, upon selecting the link 1030, a details window 1035 may be provided that may include, for example, detailed weather information for the point 1020. The detailed weather information may include the temperature information such as a current temperature and a relative temperature, visibility information, status information such as partly cloudy, cloudy, sunny, partly sunny, rain, snow, or the like, humidity information, wind information, Ultra Violet (UV) information, additional links, or the like.

Figure 11A:
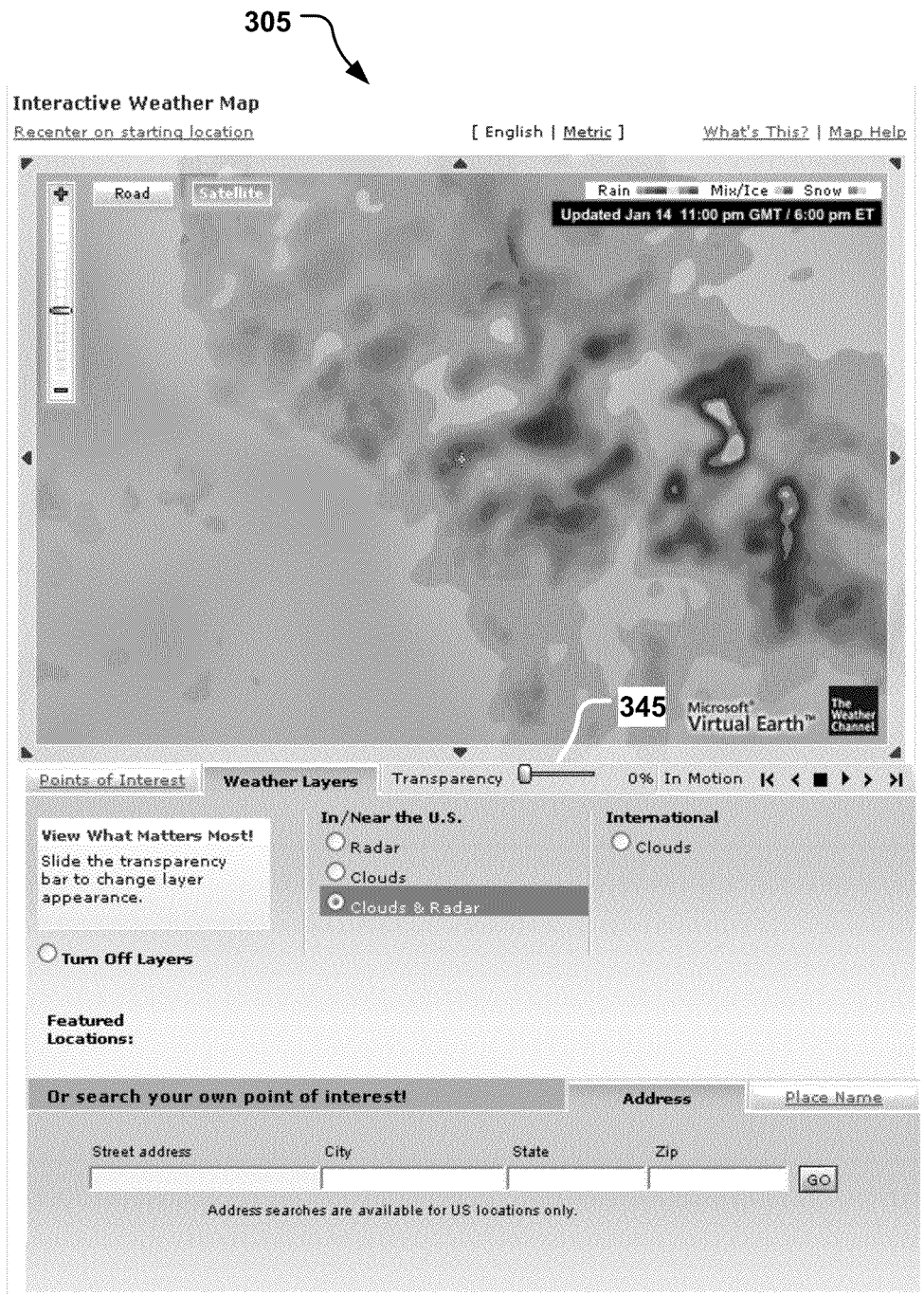
FIGS. 11A-11C depict an example embodiment of weather layers that may be provided on an interactive map.
Figure 11B:
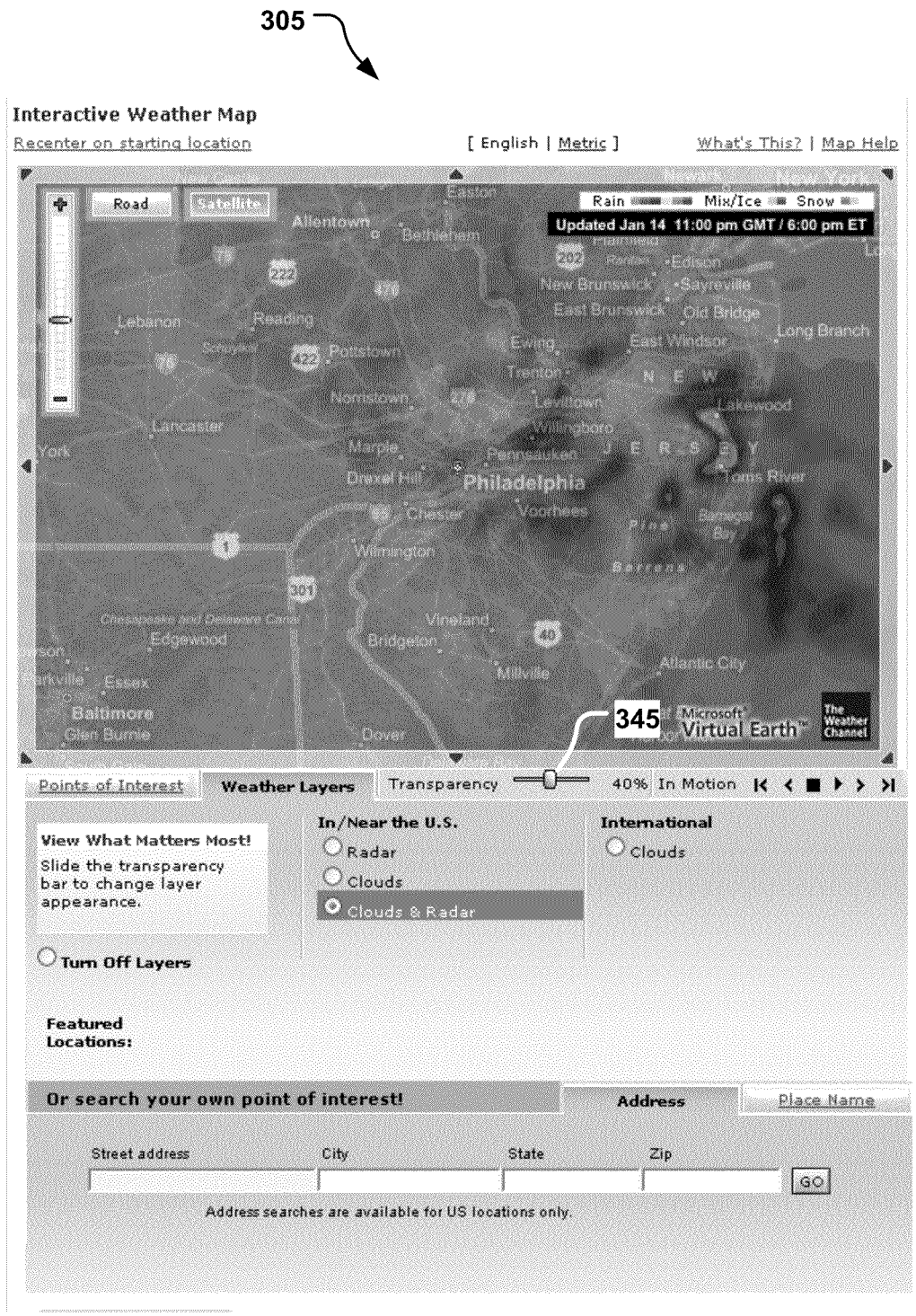
Figure 11C:
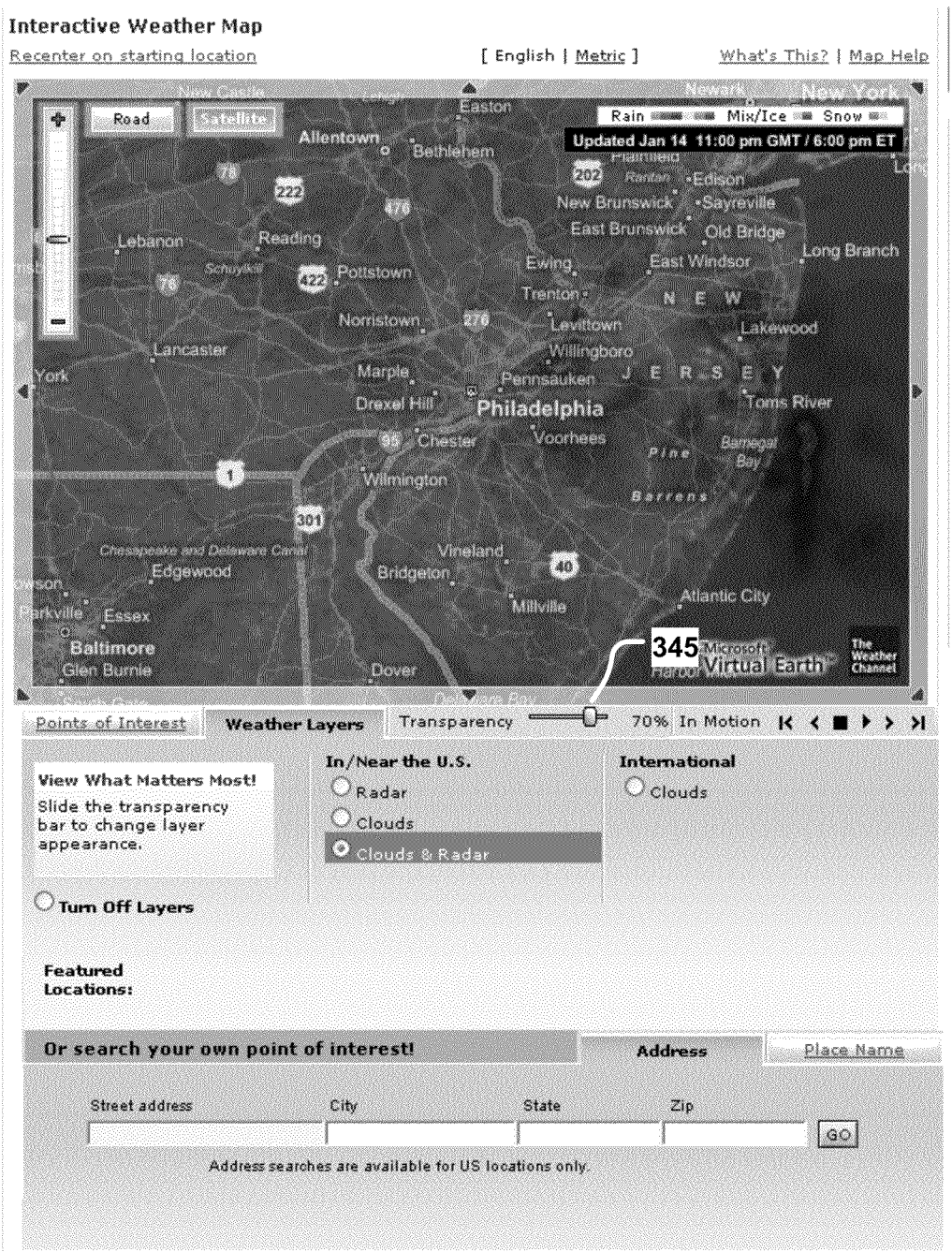

FIGS. 11A-11C depict an example embodiment of weather layers that may be provided on an interactive map. As described above with respect to FIGS. 8A-8B and 9, the interactive map 305 may include a first layer such as the first layer 805 and a second layer such as the second layer 810. The second layer may include the weather information and the first layer may include, for example, the base map 310. In an example embodiment, the second layer may be provided over the first layer such that the second layer may be transparent over the first layer.

As described above, the interactive map 305 may further include the transparency option 345. The transparency option 345 may include a slider that may be selected to adjust the transparency of the first layer over the second layer. As shown in FIG. 11A, the transparency option 345 may be adjusted to select 0% transparency such that the second layer may be opaque over the first layer. The transparency option 345 may then be adjusted to increase the level of transparency of the second layer over the first layer. For example, as shown in FIGS. 11B-11C, the transparency option 345 may be adjusted to 40%, as shown in FIG. 11B, and 70%, as shown in FIG. 11C, to increase the transparency of the second layer with respect to the first layer.

Figure 12:
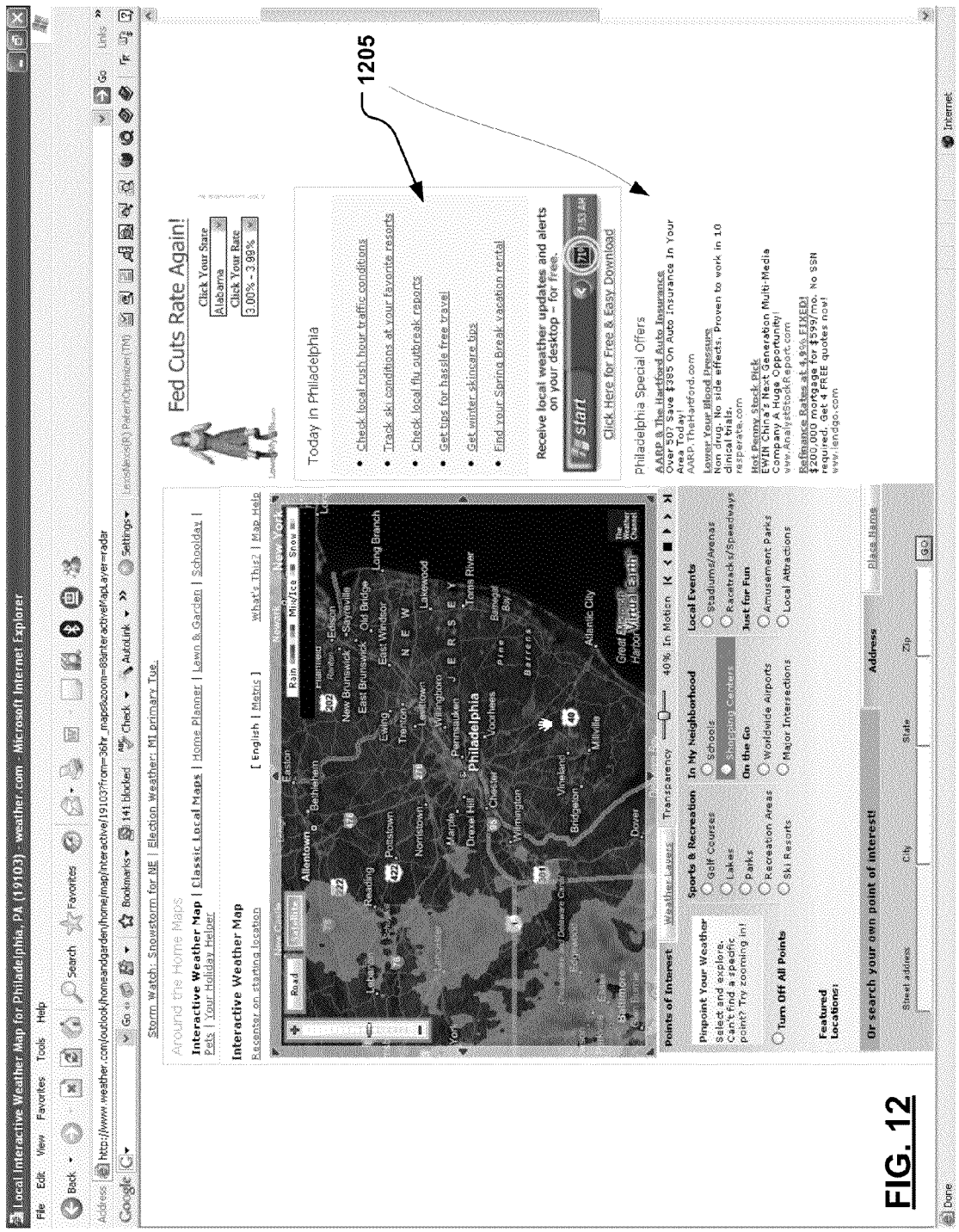
FIG. 12 depicts an example embodiment of advertising that may be provided based on an interactive map.

FIG. 12 depicts an example embodiment of advertising that may be provided based on an interactive virtual map. As shown in FIG. 12, the interface 300 may include the interactive map 305 as described above. The interface 300 may also include one or more advertisements 1205.

The one or more advertisements 1205 may be based on interaction information. According to one embodiment, the interaction information may include information associated with a geographic area, weather information of the geographic area, a pan option, a zoom option, or the like that may be selected via the interactive map 305. Thus, in an example embodiment, the one or more advertisements 1205 may correspond to the geographic area being depicted in the interactive map. For example, as shown in FIG. 12, the one or more advertisements 1205 may be associated with the Philadelphia area that may be depicted in the interactive map 305.

Additionally, the one or more advertisements 1205 may change based on selecting zoom options, pan options, or the like provided by the interactive map 305. For example, when a user such as the user 105 zooms in on a geographic area, different advertisements may be provided based on the zoom interaction.

According to an example embodiment, the one or more advertisements 1205 may be provided without refreshing the interface 300. For example, the interface 300 may include a collection of frames or objects inserted therein. The collection of objects or frames may be associated with a layout of the interface 300, but may function independently of the interface. For example, according to one embodiment, each of the objects or frames may be refreshed independent of the interface 300. The one or more advertisements 1205 may be associated with the objects or frames such that the one or more advertisements 1205 may be provided and refreshed without refreshing the interface 300.

Figure 13A:
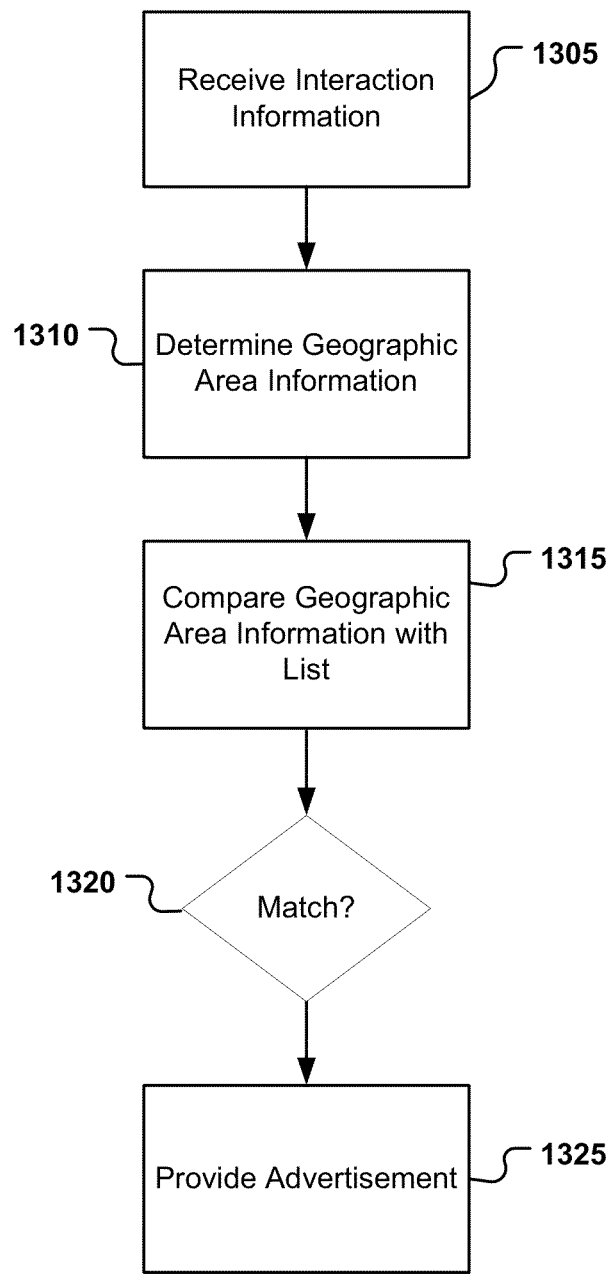
FIG. 13A depicts a flow diagram of an example method for providing advertising based on an interactive map.

FIG. 13A depicts a flow diagram of an example method for providing advertising based on an interactive map such as the interactive map 305. At 1305, interaction information may be received. As described above, the interactive information may include information associated with a geographic area, the weather information of the geographic area, a pan option, a zoom option, or the like that may be selected via the interactive map such as the interactive map 305.

According to one embodiment, the interaction information may be received by, for example, the weather information system 120 at 1305. As described above, the weather information system 120 may be a web-based server that may host interfaces such as web pages that may include the advertisements based on interaction information the interactive virtual map.

At 1310, geographic area information may be determined based on the interactive information. The geographic area information may include, for example, a geographic area being depicted by the interactive map. The geographic area information may be determined based on, for example, a zoom level that may be selected for the geographic area, a pan option that may be selected for the geographic area, or any other suitable interaction with the interactive map that may be included in the interactive information.

At 1315, the geographic area information may be compared with a list of geographic areas that may provide advertisements. For example, a list of advertisements may be indexed by geographic areas or geographic area information. The geographic area information may be compared to the indices of geographic areas or geographic areas information to determine whether an advertisement should be provided via the interface.

At 1320, if the geographic advertisement may match a geographic area or the geographic area information in the list, an advertisement may be provided at 1325. According to one embodiment, the advertisement may be provided via an interface that may include the interactive map. According to an example embodiment, the advertisement may be provided without refreshing the interface. For example, as described above, the interface may include a collection of frames or objects inserted therein that may function independently from the interface. For example, according to one embodiment, each of the objects or frames may be refreshed independent of the interface. At 1325, the advertisement may be provided via one of the frames or objects such that the advertisement may be provided without refreshing the interface.

Additionally, in an example embodiment, upon providing the advertisement via one of the frames or objects, a change in the size of the advertisement may be detected. The frame or object associated with the advertisement may then be resized within the interface to maintain the layout thereof without refreshing the interface.

The advertisement may then be displayed via the interface to the user via, for example, an electronic device such as the electronic device 110. According to one embodiment, the advertisements may be provided to the interface via a client map application such as the client map application 210 that may be, for example, a plug-in to an interface component such as the interface component 205 described above with respect to FIG. 2.

Thus, according example embodiments, an advertisement may be dynamically updated, based on for example, the interaction information and may be provided on the interface without affecting the functionality of the interface such that the user may continue to interact with the interactive map that may be provided via the interface while the advertisement may be provided and displayed via the interface.

Figure 13B:
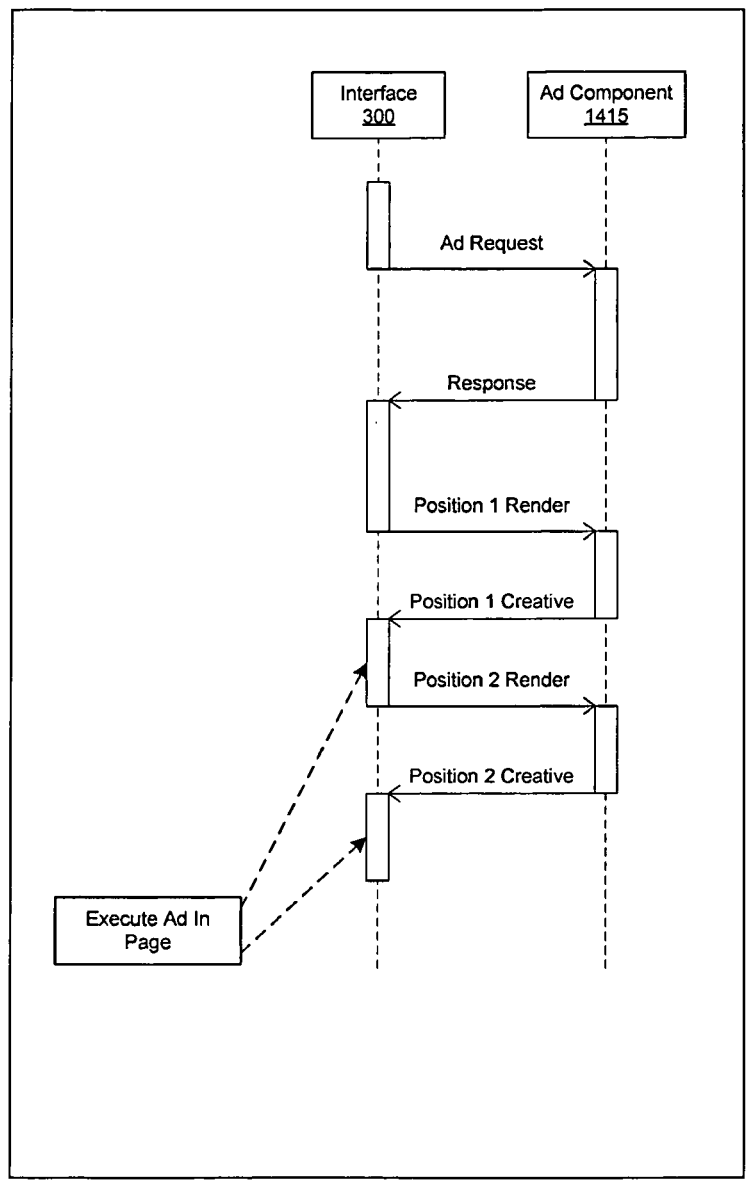
FIG. 13B depicts an example embodiment of a sequence diagram for providing an advertisement via an interface where the interface may be refreshed.

FIG. 13B depicts an example embodiment of a sequence diagram for providing an advertisement via an interface where the interface may be refreshed. For example, when the advertisement is provided to the interface for execution, the interface may be refreshed to load the advertisement in the interface. Such an embodiment as shown with respect to FIG. 13B, may require refreshing the entire content of the interface to provide the advertisement.

Figure 13C:
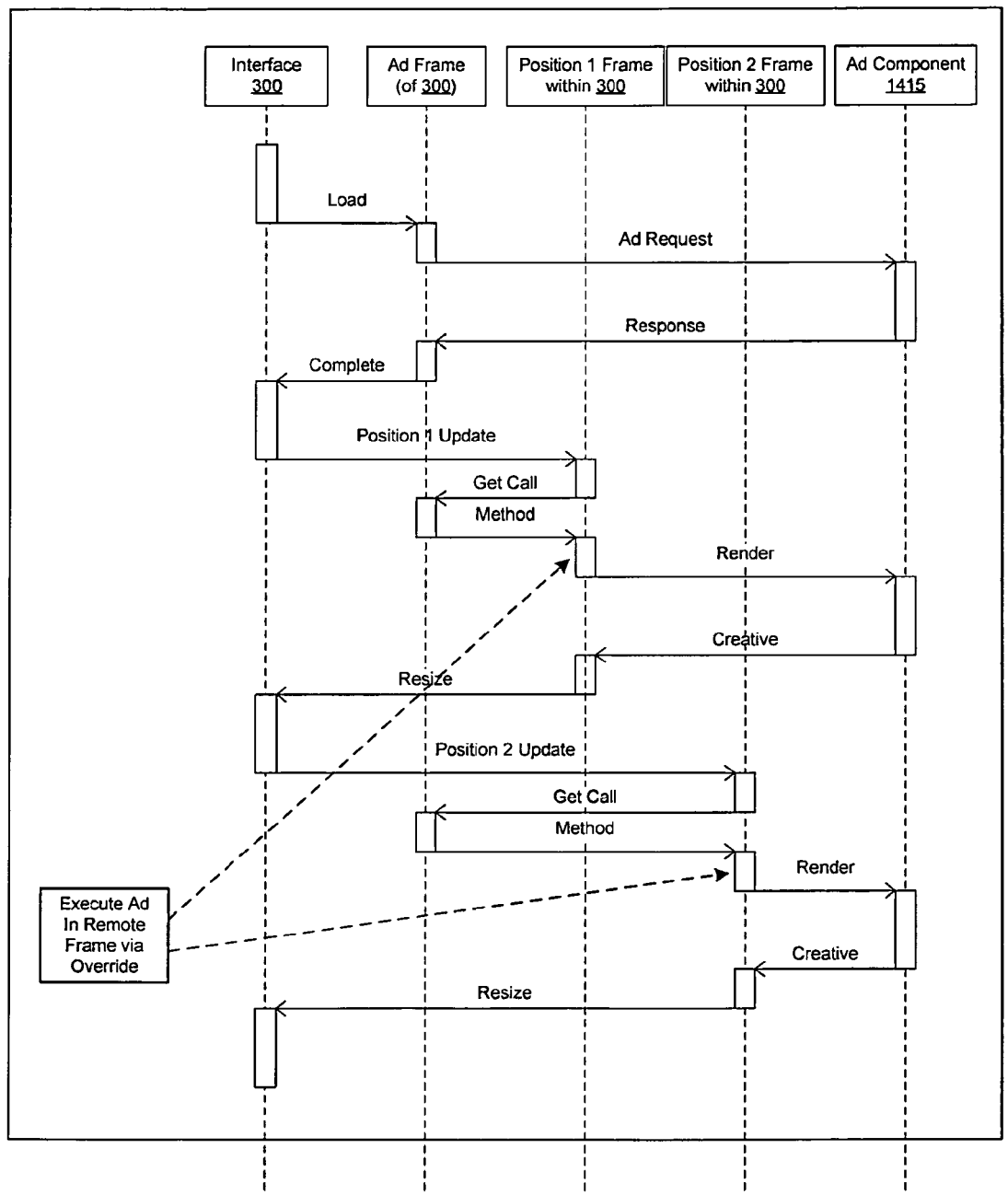
FIG. 13C depicts an example embodiment of a sequence diagram for providing an advertisement via an interface without refreshing the interface.

FIG. 13C depicts an example embodiment of a sequence diagram for providing an advertisement via an interface without refreshing the interface. For example, as described above, an advertisement may be associated with an object or frame that may be inserted in the interface. Thus, according to such an embodiment, the advertisement may be provided to the interface for execution by refreshing or updating the object or frame associated therewith and not the interface. When an advertisement refresh may be required, which may be due to a change in the advertisement target or user interaction, an interface containing the actual advertisement request may be refreshed to fetch a new advertisement. This refresh in turn may trigger a subsequent refresh on each of the visible ad objects inserted in the interface. In the embodiment illustrated in FIG. 13C, for example, the advertisements may be refreshed in the frame or object at the locations designated by the reference arrows. Such an embodiment may involve overriding the internal JavaScript methods that may be used to provide the advertisements. Overriding the JavaScript may provide for creating links between the advertisements and the frame or object such that each frame or object can be independently updated. Thus, each advertisement may be rendered as if they were part of the interface but, in fact, function independently thereof. This exemplary implementation may be useful, for example, in connection with Web2.0 applications without customization of such applications.

Figure 14:
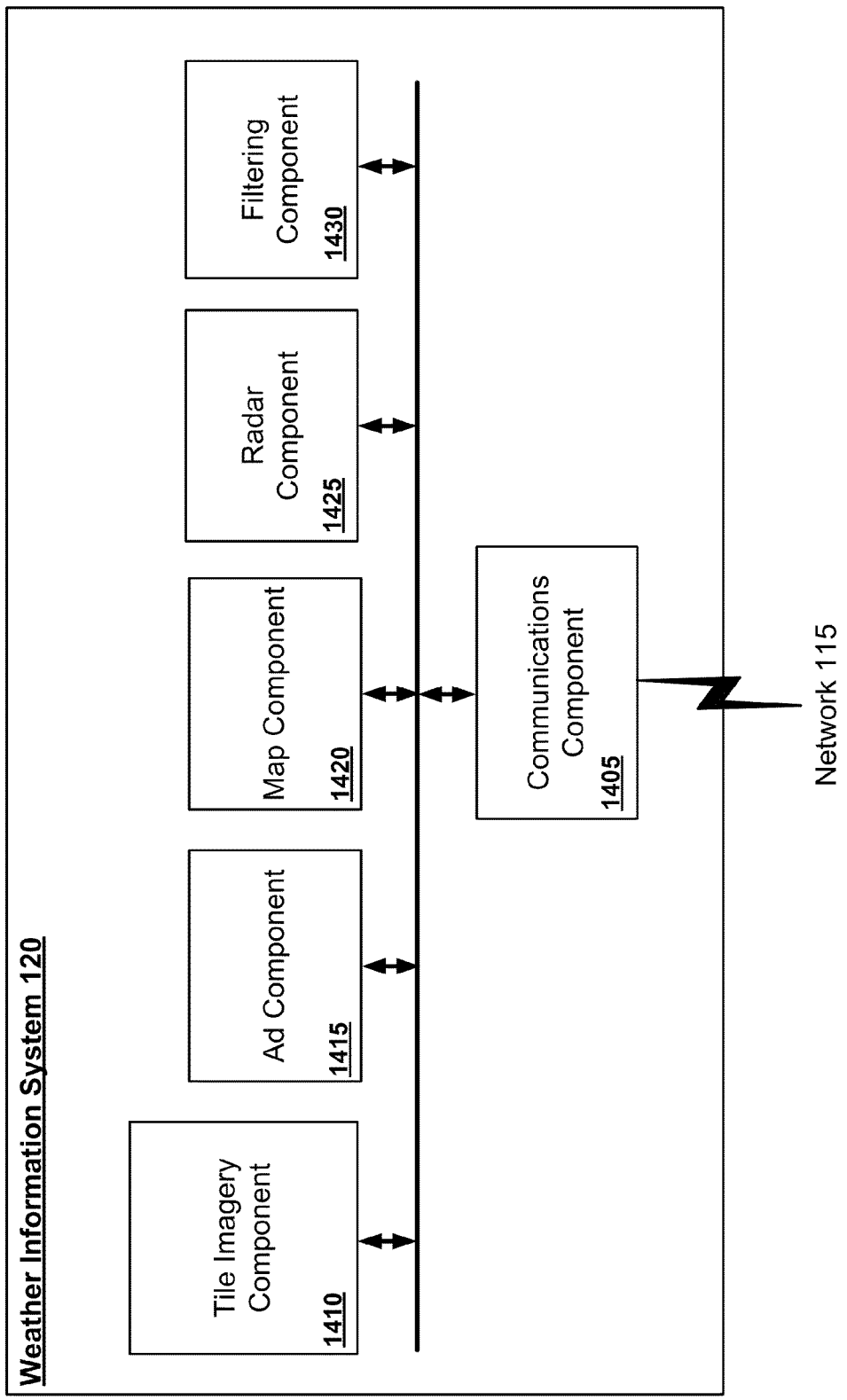
FIG. 14 depicts an example embodiment of a weather information system.

FIG. 14 depicts an example embodiment of a weather information system such as the weather information system 120. As described above, the weather information system 120 may include any combination of hardware components such as processors, databases, storage drives, registers, cache, RAM memory chips, data buses, or the like and/or software components such as operating systems, database management applications, or the like.

According to an example embodiment, the weather information system 120 may include a communication component 1405. The communication component 1405 may include a communication port such as an Ethernet port, an antenna, or the like that may be used to provide a communication link with, for example, the network 115. The weather information system 120 may receive weather information, map information from various sources such as the map information system 125, interactions with the interactive map 305, a weather source, or the like via the communication link with, for example, the network 115 that may be provided by the communication component 1405.

Additionally, the communication component 1405 may provide the weather information, map information, or the like to, for example, the network 115 such that the weather information map information, or the like may be displayed to the user 105 via the electronic device 110. Thus, in one embodiment, the communication component 1405 may be used to provide access to the information including, for example, the interfaces such as the interface 300, the weather information, the map information, or the like that may be accessed by the user 105 via the electronic device 110.

The weather information system 120 may further include a tile imagery component 1410. The tile imagery component 1410 may include various hardware components such as cache, servers, cutters, or the like and/or software components such that the map information that may be included in, for example, the base map, the weather information, or the like may be provided via an interface such as a web page, which will be described in more detail below.

The weather information system 120 may further include an ad component 1415. The ad component 1415 may include hardware components such as storage modules including, for example, cache, Random Access Memory (RAM), Read Only Memory (ROM), Flash memory, hard drives, or the like, a processor such as a standard processor, a specialized processor, or any other suitable hardware component and/or software components.

According to an example embodiment, the ad component 1415 may determine an advertisement to provide to a user such as the user 105 of an interactive map such as the interactive map 305. For example, as described above, the interaction information may include information associated with an interaction with an interactive map such as the interactive map 305, weather information received for the geographic area being depicted by the interactive map, or the like. The ad component 1415 may then determine whether the interaction information corresponds to geographic information such that advertisements may be provided based on the interaction information. According to an example embodiment, the advertisements may be provided via an interface such as a web page that may include the interactive map displayed thereon without refreshing the interface as described above.

The weather information may further include a map component 1420 and a radar component 1425. The map component 1420 and the radar components 1425 may include hardware components such as storage modules including, for example, cache, Random Access Memory (RAM), Read Only Memory (ROM), Flash memory, hard drives, or the like, a processor such as a standard processor, a specialized processor, or any other suitable hardware component and/or software components. According to an example embodiment, the map component 1420 may receive map information such as map imagery, real-time weather information, or the like from the map information system 125, described above with respect to FIG. 1.

According to one embodiment, the radar component 1425 may include the weather information such as radar information, precipitation information, cloud information described above that may be provided to a user such as the user 105. According to one embodiment, the weather information included in the radar component 1425 may be received from, for example, a weather source such as the National Weather Service (NWS).

In an example embodiment, the weather information system 120 may further include a filtering component 1430. The filtering component 1430 may include hardware components such as storage modules including, for example, cache, Random Access Memory (RAM), Read Only Memory (ROM), Flash memory, hard drives, or the like, a processor such as a standard processor, a specialized processor, or any other suitable hardware component and/or software components.

According to an example embodiment, the filtering component 1430 may determine which points of interest to display to a user on the interactive map 305. For example, as described above, points of interest such as schools, golf courses, entertainment venues including amusement parks, restaurants, amphitheaters, zoos, historical sites, museums, ski resorts, airports, parks, or the like may be displayed at an appropriate location with respect to the geographic area of the interactive map 305. In some instances, it may be difficult to display all of the points of interest corresponding to, for example, schools, golf courses, entertainment venues including amusement parks, restaurants, amphitheaters, zoos, historical sites, museums, ski resorts, airports, parks, or the like for a given geographic area or zoom level of the geographic area. For example, selecting a "School" option for the points of interest may yield too many points of interest for presentation via the interactive map 305. According to an example embodiment, the filtering component 1430 may prioritize points of interest for a selected option to determine which points of interest to display for a selected points of interest option on the interactive map 305, which will be described in more detail below.

Figure 15:
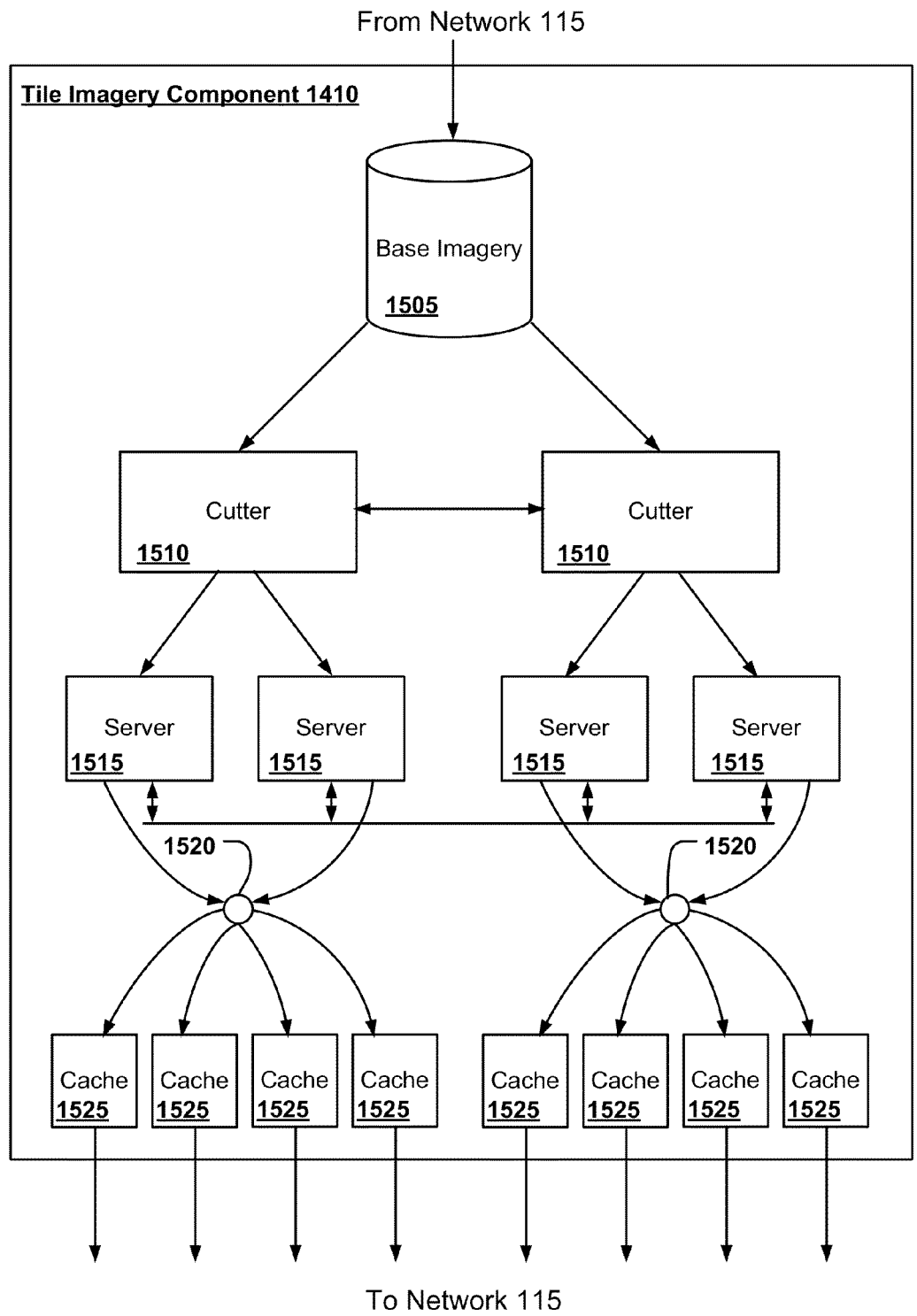
FIG. 15 depicts an example embodiment of a tile imagery component in a weather information system.

FIG. 15 depicts an example embodiment of a tile imagery component in a weather information system. The tile imagery component 1410 may include hardware components and/or software components such that the tile imagery component 1410 may dynamically generate, for example, the map information such as the base map 310 and the weather information that may be provided by the interactive map 305 using a tile set that may include a plurality of tiles as described above. According to an example embodiment, the map information may be, for example, imagery such as road imagery, aerial imagery, or the like provided by the map information system 125. Additionally, the weather information may include, for example, radar imagery that includes weather conditions provided by a weather source such as the NWS as described above.

In one embodiment, the tile imagery component 1410 may provide, for example, the weather information, map information, or the like "On Demand." For example, as described above, a user such as the user 105 may request to view a map of a geographic area in the viewport 315 of the interactive map 305. Upon receiving an indication of the requested geographic area, the tile imagery component 1410 may provide the weather information, map information, or the like associated with the requested geographic area to the user.

As described above, the base imagery such as the weather information, map information including the base map, or the like may include a plurality of tiles. According to an example embodiment, the tile imagery component 1410 may provide the imagery on a per-tile basis. For example, the tile imagery component 1410 may generate each tile and provide each tile dynamically based on the indication of the requested geographic area. Additionally, the tile imagery component 1410 may resample the base imagery to each scaling level based on, for example, a selection of a zoom option such that the tile imagery component 1410 may generate each tile and provide the tile dynamically based on the selected zoom option.

As shown in FIG. 15, the tile imagery component 120 may receive a base imagery 1505 that may be included in, for example, the map information and/or the weather information. The base imagery 1505 may be received by one or more cutters 1510 that may be included in the tile imagery component 1410. Each of the cutters 1510 may include a memory structure such as pre-cache that may store at least a portion of the data such as the tile set associated with the base imagery 1505. According to one embodiment, the tile imagery component 1410 may pre-generate each of the cutters 1510 based on the incoming base imagery 1505. For example, the tile imagery component 1410 may estimate, for example, the portion of the data such as the tile set associated with the base imagery 1505 that may be included in the interactive map 305. The cutters 1510 may then be created or generated based on the estimation to store at least a portion of the base imagery 1505 that may be provided to the interactive map 305. According to one embodiment, the cutters 1510 may then generate, for example, the tiles associated with the base imagery that may be served by the weather information system 120.

Each of the cutters 1510 may be in communication with one or more servers 1515. The servers 1515 may include an application or an electronic device that may perform services associated with the base imagery 1505 for the tile imagery component 120. For example, one or more of the servers 1515 may control a portion of the memory structure of the cutters 1510. According to one embodiment, the servers 1515 may determine the tiles that may be pre-generated by the tile imagery component 1410. For example, the servers 1515 may track the base imagery being served or accessed. Based on the tracking, the servers 1515 may estimate a portion of the data such as the tile set associated with the base imagery 1505 that may be included in the interactive map 305. The servers 1515 may then provide the estimation to, for example, the cutters 1510 such that the tiles or portion of the base imagery 1505 requested may then be created or generated and stored in the cutters 1510 based on the estimation.

According to one embodiment, the servers 1515 may be in communication with each other such that information may be shared if, for example, one server may not be functioning properly. Additionally, the servers 1515 may operate in parallel with respect to each other.

The servers 1515 may be in communication with one or more caches 1525. The caches 1525 may include a block of memory for temporary storage of data such as the tile set for a tile or a portion of the base imagery that may be used more frequently than other portions of the base imagery. The caches 1525 may then provide the data such as the tile set for the portions of the base imagery 1505 to, for example, the client weather component 200 described above via the network 115 such that the imagery for the base map and/or weather information may be displayed in the interactive map 305.

In an example embodiment, a virtual Internet Protocol, or virtual IP, 1520 may be provided as an intermediary between the servers 1515 and the caches 1525. The virtual IP 1520 may provide one IP address that each of the caches 1525 may use to communication with multiple servers 1525 such that a proper load may be balanced in the tile imagery component 120.

Thus, the tile imagery component 1410 may generate each tile and provide each tile on a per-tile request to dynamically update, for example, an interactive map such as the interactive map 305 as described above.

Figure 16:
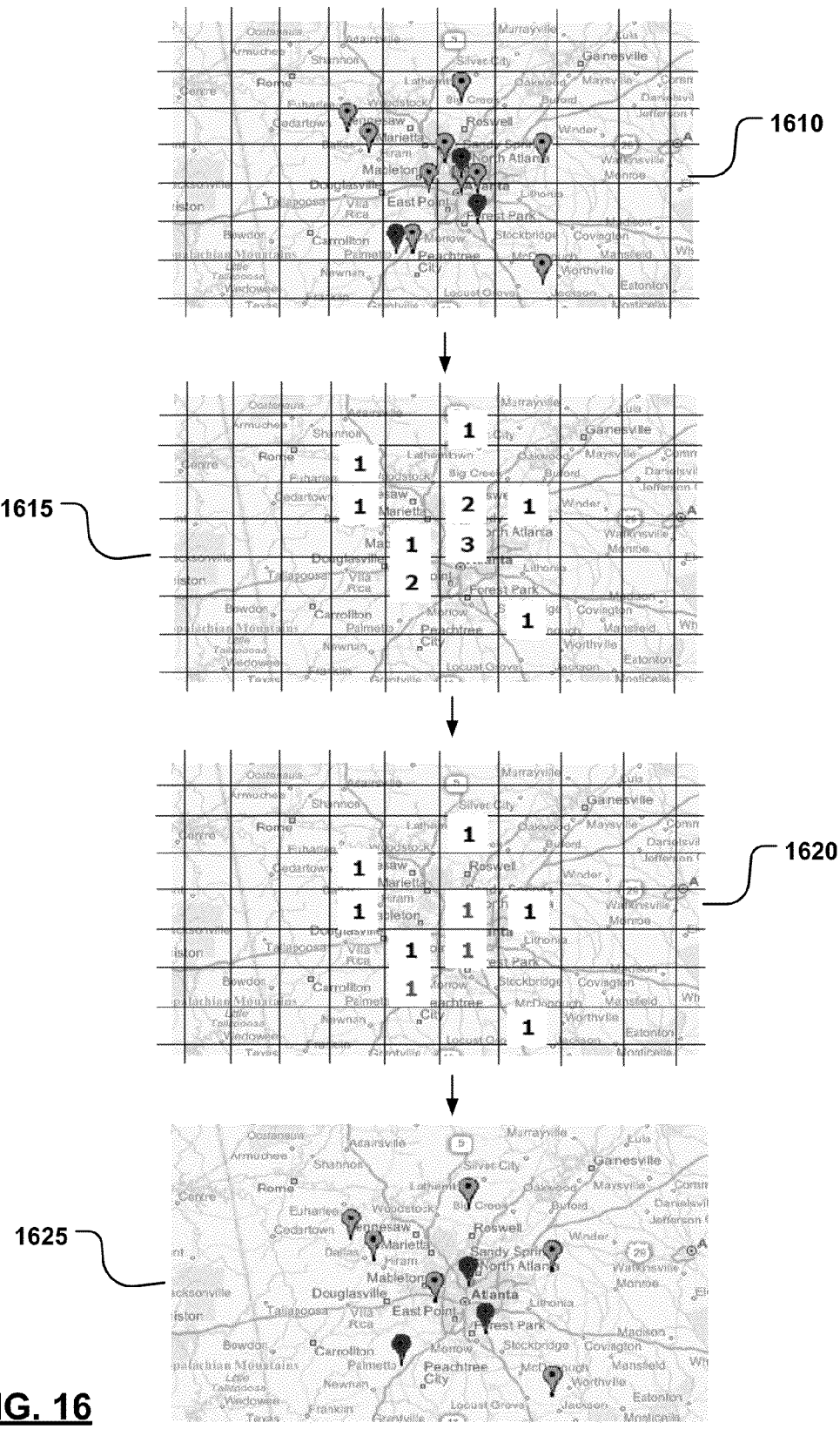
FIG. 16 depicts an example embodiment of a method for providing points of interest that may rendered on an interactive map.

FIG. 16 depicts an example embodiment of a method for providing points of interest that may displayed via on interactive map. According to an example embodiment, the method may be performed by, for example, the filtering component 1430 in the weather information system 120 described above with respect to FIG. 14. As shown in FIG. 16, points corresponding to a points of interest option that may be selected as described above may be received. Unfortunately, as shown in FIG. 16, the points for a given geographic area or zoom level of the geographic area may not be able to be properly displayed. Thus, in an example embodiment, the points may be spatially filtered such that a portion of the points may be removed to reduce the density and visual cluttering when displayed.

At 1610, a grid may be established for the points of interest as shown. The grid may be established for a target area that may be defined by, for example, the geographic area provided in the viewport 315 of the interactive map 305. As shown in FIG. 16, the grid may include a plurality of cells such that the points may be grouped into small sets. Each of the cells may include a portion of the points corresponding to a points of interest option that may be selected. According to example embodiments, the grid may be established based on the number of adjacent data points such that each cell may include approximately an equal portion of the points.

A priority for each point in a cell of the grid may be determined at 1615. For example, a list of priority values for points of interest may be compared to each point in a cell. Based on the comparison, a point value may be assigned to each of the points within the cell. As shown in FIG. 16, the priority values such as 1, 2, 3, or the like may be assigned to each point.

According to one embodiment, the priority values for a point of interest may be assigned automatically by, for example, the weather information system 120 and/or may be established by, for example, a user such as the user 105 of the interactive map 305. For example, in one embodiment, the weather information system 120 may track interactions with, for example, the interface 300 and/or the interactive map 305. Based on those interactions, the weather information system 120 may then assign the priority value to each of the points in a cell. Alternatively, the weather information system 120 may arbitrarily assign a point value to each of the points in the cell.

At 1620, the points in each cell may be filtered based on the determined priority. For example, the lower priority points, or points with the lowest priority value, may be removed from each cell such that a set of filtered points may be generated. According to one embodiment, all of the points in each cell may be removed except the point with the highest determined priority. As shown in FIG. 16, the points with the values greater than 1 may be removed from each cell.

The set of filtered points may be provided to, for example, the interactive map 305. The filtered points in the set may then be rendered on the interactive map 305 at 1625, as shown in FIG. 16. As described above the filtered points may be superimposed over the base map 310 in the viewport 315.

Thus, exemplary embodiments of systems and methods for providing an interactive map have been disclosed. An illustrative interactive map may provide a base map with weather information and/or points of interest overlaid thereon. Additionally, the interactive map may be adapted to sense and respond to options or controls such as pan options, zoom options, transparency options, playback controls, points of interest options, or the like provided by the interactive map that may be selected by a user. The interactive map may also be adapted to provide interactions with the map to, for example, and advertisement component such that advertisements may be provided based on interactions by the user with the interactive map.

While example embodiments of a various methods for providing an interactive map have been described, the underlying concepts may be performed in a variety of systems including for example, personal computers, set-top boxes, servers, personal digital assistants, or the like. Additionally, the underlying concepts may be embodied in the form of computer executable instruction (i.e., program code) stored on a computer-readable storage medium which instructions, when executed by a machine, such as a computer, perform and/or implement the methods and systems described above. Specifically, any of the steps, operations or functions described above may be implemented in the form of such computer executable instructions. Computer readable storage media include both volatile and nonvolatile, removable and non-removable media implemented in any method or technology for storage of information. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by a computer.

What is claimed:

1. A method for providing an interactive map to a user via a computing system, the method comprising:

receiving a first layer and a second layer, wherein the first layer comprises a base map and the second layer comprises dynamic information;

providing the second layer over the first layer, wherein the second layer is opaque over the first layer; and displaying an interface comprising the first layer and the second layer, wherein the dynamic information of the second layer is suspended in response to at least a portion of a new first layer being received, wherein the interface includes a user interface element configured to adjust a level of transparency of he second layer.

2. The method of claim 1, wherein the dynamic information comprises weather information.

3. The method of claim 2, wherein the weather information comprises at least one of the following: radar information, precipitation information, and cloud information.

4. The method of claim 1, further comprising receiving a third layer, wherein the third layer comprises points of interest.

5. The method of claim 4, wherein the displayed interface further comprises the third layer.

6. The method of claim 4, further comprising providing the third layer over the first layer, wherein the third layer comprises a visual indication of the point of interest over the first layer, and wherein the second layer is provided over the first layer and the third layer.

7. The method of claim 4, further comprising providing the third layer over the first layer and the second layer, wherein the third layer comprises a visual indication of the point of interest over the first layer and the second layer.

8. A method for generating tiles in an interactive map presented to a user via a computing system, the method comprising:
   displaying a base map within a viewport, wherein the base map comprises a first plurality of tiles stored in an array having a size corresponding to a size of the viewport;
   providing a transparency option configured to adjust a transparency of one or more of the base map or individual tiles associated with the base map;
   providing a pan option configured to be used to interact with the base map displayed in the viewport;
   receiving a selection of the pan option;
   exposing a blank portion in the viewport based on the received selection of the pan option by discarding one or more of the first plurality of tiles from the array;
   generating a new tile associated with each of the one or more of the first plurality of tiles that were discarded to replace the blank portion in the viewport; and
   rendering the new tile associated with each of the one or more of the first plurality of tiles that were discarded within the viewport.

9. The method of claim 8, further comprising panning the base map within the viewport in a direction associated with the selection of the pan option, wherein the blank portion is exposed in the direction the base map is being panned based on the selection of the pan option.

10. The method of claim 8, further comprising displaying weather information over the base map within the viewport, wherein the weather information comprises a second plurality of tiles.

11. The method of claim 10, wherein a new weather the associated with the second plurality of tiles is generated to replace the blank portion in the viewport; and wherein the new weather the of the plurality of tiles is rendered within the viewport.

12. A method for generating tiles in an interactive map presented to a user, the method comprising:
   displaying a base map within a viewport, wherein the base map comprises a first zoom layer, wherein the first zoom layer comprises a first plurality of tiles stored in an array having a size corresponding to a size of the viewport;
   providing a transparency option configured to adjust a transparency of one or more of the base map or individual tiles associated with the base map;
   providing a zoom option configured to be used to interact with the base map displayed in the viewport;
   receiving a selection of the zoom option, wherein the first zoom layer is visible within the viewport and scaled based on the selection of the zoom option;
   generating a second zoom layer to replace the first zoom layer in the viewport, wherein the second zoom layer comprises a second plurality of tiles;
   replacing the first plurality of tiles stored in the array with the second plurality of tiles; and
   rendering the second zoom layer over the first zoom layer within the viewport such that second zoom layer is superimposed over the first zoom layer.

13. The method of claim 12, further comprising scaling the base map within the viewport based on the selection of the zoom option.

14. The method of claim 12, wherein the first plurality of tiles is visible within the viewport and scaled based on the selection of the zoom option.

15. The method of claim 12, wherein the first plurality of tiles are not replaced until each of the second plurality of tiles are generated.

16. The method of claim 12, further comprising displaying weather information over the base map within the viewport, wherein the weather information comprises a first weather zoom layer.

17. The method of claim 16, wherein a second weather zoom layer is generated to replace the first weather zoom layer, and wherein the second weather zoom layer s rendered over the first weather zoom layer within the viewport.

18. A method for providing advertising to a user of an interactive map, the method comprising:
   receiving interaction information;
   determining geographic area information based on the received interactive information;
   comparing the geographic area information with a list of geographic areas that provide advertisements; and
   providing an advertisement associated with a geographic area if, based on the comparison, the geographic area information matches one of the geographic areas in the list, wherein the advertisement is provided via an object in an interface that includes the interactive map, and wherein the advertisement is provided via the object without refreshing the interactive map of the interface; and
   providing a transparency option configured to adjust a transparency of the advertisement with respect to the interactive map.

19. The method of claim 18, wherein the advertisement is provided to an interface that includes the interactive map, and wherein the advertisement is rendered on the interface.

20. The method of claim 18, wherein the interaction comprises at least one of following: a zoom interaction and a pan interaction.

21. The method of claim 20, the geographic area information is determined based on a selection of at least one of the zoom interaction and the pan interaction.

22. The method of claim 18, wherein the geographic information comprises at least a geographic area of the interactive map.

23. A method for determining points of interest to display on an interactive map provided by a computing system, the method comprising:
   receiving points associated with a selected point of interest;
   establishing a grid for a target area of the received points, wherein the grid comprises a plurality of cells, and wherein a portion of the points are in each cell;

determining a priority for each point of the portion of the points in each cell;

filtering the points of the portion of the points in each cell based on the determined priority;

providing the filtered points to the interactive map, wherein the points of the portion of points are filtered to reduce a density of the filtered points provided to the interactive map; and providing a transparency option configured to adjust a transparency of the filtered points with respect to the interactive map.

24. The method of claim 23, wherein the target area is defined by a viewport of the interactive map.

25. The method of claim 23, wherein determining the priority for each point of the portion of the points in each cell further comprises:

comparing each point of the portion of the points in each cell with a stored list of priority values for the points; and assigning a priority value to each point of the portion of the points in each cell based on the comparison.

26. The method of claim 23, wherein filtering the points of the portion of the points in each cell based on the determined priority further comprises removing the points of the portion of the points in each cell except the point with a highest priority based on the determined priority.

27. The method of claim 23, wherein providing the subset of the filtered points to the interactive map further comprises rendering the points over a base map of the interactive map.

28. The method of claim 23, wherein the selected point of interest comprises at least one of the following: schools, golf courses, entertainment venues including amusement parks, restaurants, amphitheaters, zoos, historical sites, museums, ski resorts, airports, and parks.

* * * * *